(12) United States Patent
Zhou et al.

(10) Patent No.: US 11,921,931 B2
(45) Date of Patent: Mar. 5, 2024

(54) METHODS AND SYSTEMS FOR MULTI-PRECISION DISCRETE CONTROL OF A USER INTERFACE CONTROL ELEMENT OF A GESTURE-CONTROLLED DEVICE

(71) Applicants: Wei Zhou, Richmond Hill (CA); Sachi Mizobuchi, Toronto (CA); Rafael Veras Guimaraes, North York (CA); Ghazaleh Saniee-Monfared, Toronto (CA); Wei Li, Richmond Hill (CA)

(72) Inventors: Wei Zhou, Richmond Hill (CA); Sachi Mizobuchi, Toronto (CA); Rafael Veras Guimaraes, North York (CA); Ghazaleh Saniee-Monfared, Toronto (CA); Wei Li, Richmond Hill (CA)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 224 days.

(21) Appl. No.: 17/125,462

(22) Filed: Dec. 17, 2020

(65) Prior Publication Data
US 2022/0197392 A1    Jun. 23, 2022

(51) Int. Cl.
*G06F 3/01* (2006.01)
*G06F 3/04815* (2022.01)
*G06F 3/04845* (2022.01)
*G06F 3/04847* (2022.01)
*G06V 20/40* (2022.01)
(Continued)

(52) U.S. Cl.
CPC .......... *G06F 3/017* (2013.01); *G06F 3/04815* (2013.01); *G06F 3/04845* (2013.01); *G06F 3/04847* (2013.01); *G06V 20/46* (2022.01); *G06V 40/107* (2022.01); *G06V 40/28* (2022.01)

(58) Field of Classification Search
None
See application file for complete search history.

(56) References Cited

U.S. PATENT DOCUMENTS

| 10,261,595 B1* | 4/2019 | Kin | G06F 3/04815 |
| 2011/0221666 A1* | 9/2011 | Newton | G06F 3/0304 |
| | | | 345/156 |

(Continued)

OTHER PUBLICATIONS

Casiez, G. et al., "The Impact of Control-Display Gain on User Performance in Pointing Tasks", Human-Computer Interaction, 2008, vol. 23, pp. 215-250.

(Continued)

*Primary Examiner* — Tadesse Hailu

(57) ABSTRACT

Methods and systems for discrete control of user interface elements such as graphical widgets are described. A first plurality of video frames are captured and processed to recognize hand gestures therein. A dragging mode is activated in response to a dragging mode activation hand gesture in the first plurality of frames. A second plurality of video frames are captured and processed to allow recognition of hand gestures therein. Dragging, an element of a user interface control, in response to recognition of a discrete control hand gesture in the second plurality of frames. The discrete control of a user interface control using mid-air hand gestures allows precise setting of system parameters associated with the user interface control.

20 Claims, 19 Drawing Sheets

(51) Int. Cl.
*G06V 40/10* (2022.01)
*G06V 40/20* (2022.01)

(56) References Cited

U.S. PATENT DOCUMENTS

| | | | | |
|---|---|---|---|---|
| 2011/0314427 | A1* | 12/2011 | Sundararajan | G06F 9/451 345/173 |
| 2013/0088429 | A1* | 4/2013 | Yang | G06F 1/3231 345/158 |
| 2013/0211843 | A1* | 8/2013 | Clarkson | G06F 3/017 704/275 |
| 2014/0201666 | A1* | 7/2014 | Bedikian | G06F 3/0325 715/771 |
| 2014/0201690 | A1* | 7/2014 | Holz | G06F 3/04817 715/863 |
| 2017/0364198 | A1* | 12/2017 | Yoganandan | G06F 3/0488 |
| 2018/0088792 | A1* | 3/2018 | Klein | G06F 3/017 |
| 2019/0073040 | A1* | 3/2019 | Luchner | G06F 3/016 |

OTHER PUBLICATIONS

Nancel, M. et al., "High-Precision Pointing on Large Wall Displays Using Small Handheld Devices", Proceedings of the SIGCHI Conference on Human Factors in Computing Systems, Apr. 2013, pp. 831-840.
Yeo, H-S et al., "WRIST: Watch-Ring Interaction and Sensing Technique for Wrist Gestures and Macro-Micro Pointing", Proceedings of the 21st International Conference on Human-Computer Interaction and Mobile Devices and Services, Oct. 2019, pp. 1-15.
Vogel, D. et al., "Distant Freehand Pointing and Clicking on Very Large, High Resolution Displays", Proceedings of the 18th Annual ACM Symposium on User Interface Software and Technology, Oct. 2005, pp. 32-42.

* cited by examiner

700

```
┌─────────────────────────────────────────────────────────────┐
│ Obtaining a first plurality of video frames of a video      │
│ captured by an image-capturing device of the                │
│ gesture-controlled device  710                              │
└─────────────────────────────────────────────────────────────┘
                              │
                              ▼
┌─────────────────────────────────────────────────────────────┐
│ Activating a dragging mode for the user interface control   │
│ element in response to recognition of a dragging mode       │
│ activation mid-air hand gesture performed by a user of the  │
│ gesture-controlled device in the first plurality of video   │
│ frames  720                                                 │
└─────────────────────────────────────────────────────────────┘
                              │
                              ▼
┌─────────────────────────────────────────────────────────────┐
│ Obtaining a second plurality of video frames of the video   │
│ captured by the image-capturing device of the               │
│ gesture-controlled device  730                              │
└─────────────────────────────────────────────────────────────┘
                              │
                              ▼
┌─────────────────────────────────────────────────────────────┐
│ Moving, a draggable graphical widget of the user interface  │
│ control element, by a discrete distance, in a default       │
│ dragging direction in response to recognition of a dynamic  │
│ discrete control mid-air hand gesture performed by the      │
│ user of the gesture-controlled device in the second         │
│ plurality of video frames  740                              │
└─────────────────────────────────────────────────────────────┘
```

Figure 19

METHODS AND SYSTEMS FOR MULTI-PRECISION DISCRETE CONTROL OF A USER INTERFACE CONTROL ELEMENT OF A GESTURE-CONTROLLED DEVICE

FIELD

This disclosure relates generally to gesture-controlled devices, and more specifically to methods and systems for multi-precision discrete control of a user interface control element displayed on a display of a gesture-controlled device.

BACKGROUND

Traditionally, a user of an electronic device has used a pointing device, such as a hand-held mouse or joystick, or a finger or stylus to interact with the electronic device. For example, moving a hand-held mouse across a physical surface and activating switches (e.g., by pressing buttons) on the mouse enables a user to interact with (e.g., control) an electronic device. Similarly, a touch of a human finger or stylus on a touch-sensitive surface of an electronic device, such as a trackpad or touchscreen display of the electronic device, and movement of the finger or stylus on the touch-sensitive surface enables a user to interact with (i.e., to control and provide data to) the electronic device.

Modern electronic devices, such a televisions, large display screen, vehicle infotainment systems, enable a user to interact with such electronic devices using gestures performed in a space in front of the electronic device. A camera of such devices (or a camera connected to such devices) captures a video of the user performing gestures in a field of view (FOV) of and process the video to recognize the gestures. Such gestures are referred to as mid-air gestures and enable a user to interact with modern electronic devices in a more efficient manner than with a pointing device (e.g. mouse) but without having to physically touch the display of the electronic device.

Mid-air gestures may be useful for interacting with a user interface element displayed on a display of such modern electronic devices; however, interaction with such user-interface elements using mid-air gestures can be difficult and imprecise.

Accordingly, improvements, which enable a user to interact with gesture-controlled devices using mid-air gestures in a more efficient manner, are desirable.

SUMMARY

In various examples, the present disclosure describes methods and systems for multi-precision discrete control of a user interface (UI) control element.

In various examples, the present disclosure describes methods and systems for multi-precision discrete control of a user interface (UI) control element. The disclosed methods and system recognize real-time interaction with a UI control element and manipulation of a draggable element (e.g. graphical widget) of the UI control element by a user of the gesture-controlled device. Activation of a dragging mode for the UI control element, and recognition of a discrete control gesture after activation of a dragging mode for the UI control element causes movement of the draggable element of the UI control element by a discrete amount. Movement of the element of the UI control element by a discrete amount can cause adjustment of a value of system parameter associated with the UI control element by a discrete amount. The method and systems of the present disclosure enable precision discrete control of a UI control element displayed on a display of gesture-controlled device and a system parameter associated with the UI control element.

In one aspect, the present disclosure describes a method for controlling a user interface control element displayed on a display of a gesture-control device. The method includes obtaining a first plurality of video frames of a video captured by an image-capturing device of the gesture-controlled device, and activating a dragging mode for the user interface control element in response to recognition of a dragging mode activation mid-air hand gesture performed by a user of the gesture-controlled device in the first plurality of video frames. The method further includes obtaining a second plurality of video frames of the video captured by the image-capturing device of the gesture-controlled device, and moving a draggable graphical widget of the user interface control element, by a discrete distance, in a default dragging direction in response to recognition of a dynamic discrete control mid-air hand gesture performed by the user of the gesture-controlled device in the second plurality of video frames.

In some examples of the present disclosure, the method further comprises adjusting a system parameter associated with the user interface control element by a discrete amount.

In some examples of the present disclosure, the method further comprises deactivating the dragging mode for the user interface control element in response to recognition of a dragging mode deactivation gesture performed by the user of the gesture-controlled device in the second plurality of video frames.

In some examples of the present disclosure, the method further comprises setting the default dragging direction for the draggable graphical widget of the user interface control element in response to recognition of a direction setting mid-air hand gesture.

In some examples of the present disclosure, recognition of the direction setting mid-air hand gesture comprises recognition of a dynamic direction setting mid-air hand gesture by a primary hand in a third plurality of video frames of the video.

In some examples of the present disclosure, recognition of the dynamic direction setting mid-air hand gesture comprises determining an initial position of the primary hand of the user within the first plurality of video frames, and recognition of the dynamic direction setting mid-air hand gesture comprises determining that the primary hand has moved from the initial position to a subsequent position within the third plurality of video frames.

In some examples of the present disclosure, the initial position is determined between a point on the primary hand and a point of reference within the first plurality of video frames, and the subsequent position is determined between a point on the primary hand and a point of reference within the third plurality of video frames.

In some examples of the present disclosure, setting the default dragging direction further comprises comparing the initial position and the subsequent position, and determining whether a difference between the initial position and the subsequent position is greater than a particular threshold.

In some examples of the present disclosure, the discrete distance is based on the difference between the initial position and the subsequent position.

In some examples of the present disclosure, the initial position is determined by an initial horizontal distance between the point on the primary hand and the point of reference within the first plurality of video frames, and the subsequent position is determined by a subsequent horizontal distance between the point on the primary hand and the point of reference within the third plurality of video frames.

In some examples of the present disclosure, the initial position is determined by an initial height between the point on the primary hand and the point of reference within the first plurality of video frames, and the subsequent position is determined by a subsequent height between the point on the primary hand and the point of reference within the third plurality of video frames.

In some examples of the present disclosure, recognition of the direction setting mid-air hand gesture comprises recognition of a direction setting mid-air hand gesture by a secondary hand in the second plurality of video frames.

In some examples of the present disclosure, the dynamic discrete control mid-air hand gesture comprises a dynamic pinching mid-air hand gesture.

In the preceding example, the dynamic pinching mid-air hand gesture comprises a pinch open hand gesture followed by a pinch closed hand gesture.

In some examples of the present disclosure, the user interface control element comprises a slider control, and moving the draggable graphical widget of the user interface control comprises dragging a slider element along a track of the slider control.

In another aspect, the present disclosure describes a gesture-controlled device that includes an image-capturing device, a processor, and a memory coupled to the processor, the memory storing machine-executable instructions thereon. The machine-executable instructions, when executed by the processor, cause the gesture-controlled device to process a first plurality of video frames of a video captured by the image-capturing device to recognize hand gestures performed by a user of the gesture controlled device. The machine-executable instructions, when executed by the processor, further configure the gesture-controlled device to activate a dragging mode for controlling a user interface control element in response to recognition of a dragging mode activation mid-air hand gesture in the first plurality of video frames, process a second plurality of video frames of the video captured by the image-capturing device to recognize hand gestures performed by the user of the gesture-controlled device, and move a draggable graphical widget of the user interface control element, by a discrete distance, in a default dragging direction in response to recognition of a dynamic discrete control mid-air hand gesture performed by the user in the second plurality of video frames.

In some examples of the present disclosure, the machine-executable instructions further cause the gesture-controlled device to deactivate the dragging mode for the user interface control element in response to recognition of a dragging mode deactivation gesture performed by the user of the gesture-controlled device in the second plurality of video frames.

In some examples of the present disclosure, the machine-executable instructions further cause the gesture-controlled device to set the default dragging direction for the draggable graphical widget of the user interface control element in response to recognition of a direction setting mid-air hand gesture.

In some examples of the present disclosure, the recognition of the direction setting mid-air hand gesture comprises recognition of a dynamic direction setting mid-air hand gesture by a primary hand in a third plurality of video frames of the video.

In yet another aspect, the present disclosure describes a computer readable medium having machine instructions stored thereon. The instructions, when executed by a processor cause the gesture-controlled device to process a first plurality of video frames of a video captured by an image-capturing device to recognize hand gestures performed by a user of the gesture-controlled device, activate a dragging mode for controlling a user interface control element in response to recognition of a dragging mode activation mid-air hand gesture in the first plurality of video frames, process a second plurality of video frames of the video captured by the image-capturing device to recognize hand gestures performed by the user of the gesture-controlled device, and move a draggable graphical widget of the user interface control element, by a discrete distance, in a default dragging direction in response to recognition of a dynamic discrete control mid-air hand gesture performed by the user in the second plurality of video frames.

The recognition of mid-air hand gestures for discrete control (e.g. adjustment or movement) of a draggable element (e.g. a widget) of a UI control element that is associated with a system parameter causes adjustment of a value of a system parameter by a predetermined amount and may have the following advantages. Discrete control provides higher precision adjustment capability for changing a value of a system parameter. For example, a discrete control gesture may adjust the value of a system parameter by a small percentage such as 1%-5%, a precision that may be difficult to achieve with a continuous control gesture such as a touch on and a drag of a draggable UI control element.

BRIEF DESCRIPTION OF THE DRAWINGS

Reference will now be made, by way of example, to the accompanying drawings which show example embodiments of the present application, and in which:

FIG. 19 is a flowchart depicting a method in a gesture-controlled device, in accordance with example embodiments.

DESCRIPTION OF EXAMPLE EMBODIMENTS

Figure 1:
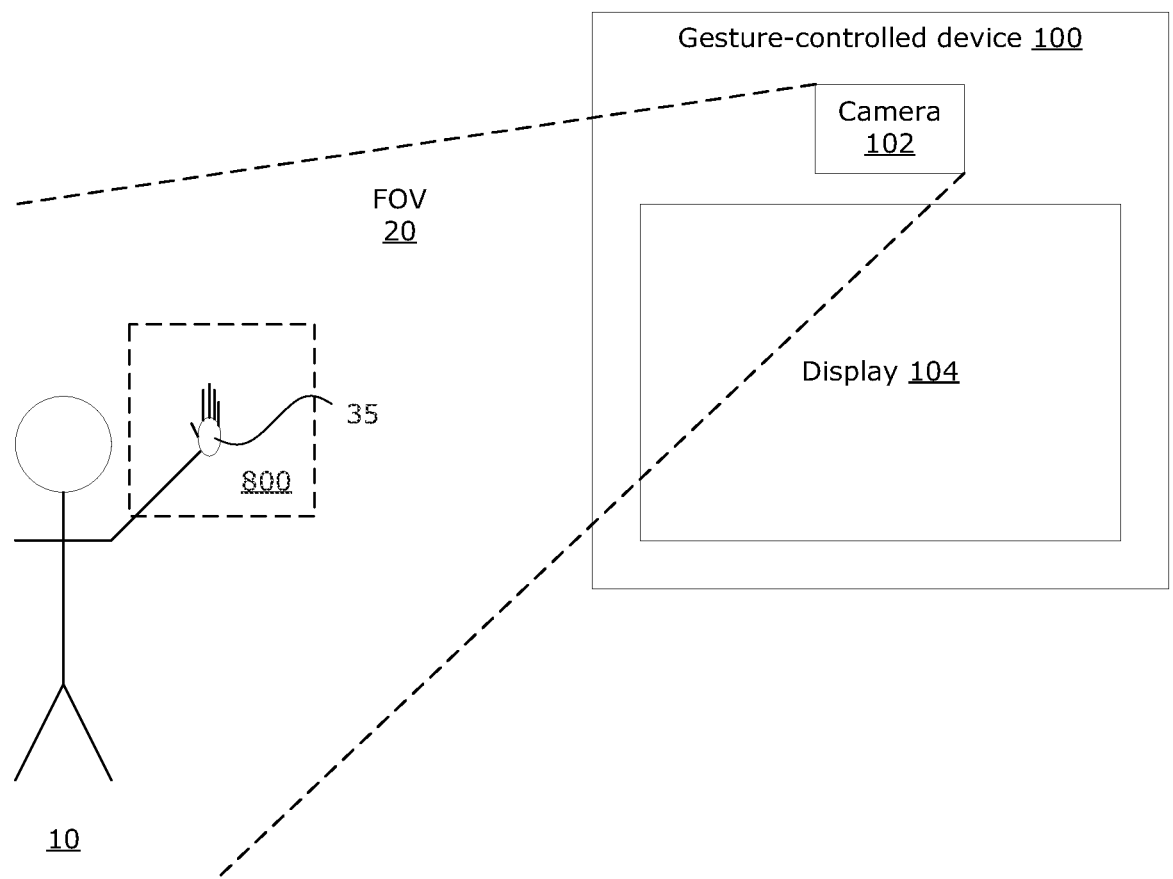
FIG. 1 is a diagram illustrating a user interacting with a gesture-controlled device.

Gesture-control devices enable users to interact with a UI control element using a mid-air hand gestures. However, it can be difficult for the user to make fine grain adjustments of a UI control element using a mid-air hand gesture. For example, for a slider, a user using a mid-air hand gesture may drag a slider element of the slider, which may result in adjustment (i.e., movement) of the slider element by a larger amount than an intended distance. This causes a coarse adjustment to a system parameter associated with the slider. Such a coarse adjustment may lead to the imprecise operation of a system parameter associated with the UI control element, thus yielding potentially dangerous or undesired outcomes. Additionally, a system parameter associated with the UI control element may control an industrial process. The system parameter may not be optimally configured if the draggable graphical widget of the UI control element associated with the system parameter cannot be precisely or accurately controlled (i.e. manipulated by a user using a mid-air gesture), resulting in potentially hazardous conditions and/or faulty products.

The presented embodiments relate to multi-precision discrete control of a user interface (UI) control element displayed on a display of a gesture-controlled device. The UI control element may include a draggable element (e.g., a graphical widget) and the UI control element may be associated with a system parameter of the gesture-controlled device. Recognition of manipulation (e.g., movement) of the draggable element of the UI control element may cause adjustment of a system parameter of the gestured-controlled device, such as a magnitude of the system parameter associated with the UI control element. Examples of system parameters include audio-visual parameters such as contrast, brightness, color and volume for a display device. Other examples of system parameters that are adjustable by manipulation of a draggable element of the UI control element include industrial process parameters, mechanical motion parameters such as range of motion and speed, and other physical parameters such as temperature, pressure, and humidity.

Examples of a UI control element include a scroll bar, a slider, a rotary control element, and a progress bar. Examples of draggable elements include a thumb, a slider, a rotating element, a widget, and a knob, etc. Examples of such system parameters include contrast, time, volume, brightness, zooming/panning magnification. A gesture-controlled device may be a television (e.g., smart TV), a desktop device, a videoconferencing system, a video gaming system, a vehicle-coupled device (e.g., a dashboard device), an augment reality (AR) or virtual reality (VR) system, or a smart speaker, among other possibilities.

The methods and systems described herein recognize user interaction with any UI control element displayed on a display of the gesture-controlled device using a mid-air gesture. Recognition of interaction with a UI control element includes recognition of a mid-air gesture associated with the UI control element. Examples of the methods and systems of the present disclosure also enable multi-precision discrete control of a UI control element displayed in an interaction space rendered by augmented reality (AR) or virtual reality (VR) system, among other possibilities.

For simplicity, the present disclosure describes examples in the context of a gesture-controlled device having a display device (e.g., a smart television (TV) or a display device in communication with a videoconferencing system). The described methods and systems for discrete multi-precision control of a UI control element displayed on the display of the gesture-controlled device for, for example for adjusting (i.e. changing) a system parameter of the gesture-controlled device for playback of a video. However, it should be understood that the present disclosure is not limited to such embodiments, and the methods and systems described herein may involve recognition of a variety of mid-air hand gestures for discrete control a draggable UI control element displayed on a display of a gesture-controlled device. For example, some embodiments of the methods and system described herein may use other output devices, such as an audio speaker, to provide feedback information to users. Some embodiments may enable users to use mid-air hand gestures to interact with other types of content or other software applications, such as a music player, a videoconferencing application, a video game, or a content rendering in an interaction space by a multi-user virtual reality (VR) or augmented reality (AR) system, among other possibilities. A draggable element of a UI control element displayed on a display of the gesture-controlled device may be controlled using mid-air hand gestures.

The recognition of mid-air hand gestures for discrete control (e.g. adjustment or movement) of a draggable element (e.g. a widget) of a UI control element that is associated with a system parameter causes adjustment of a value of a system parameter by a predetermined amount may have the following advantages. Discrete control provides higher precision adjustment capability for changing a value of a system parameter. For example, a discrete control gesture may adjust the value of a system parameter by a small percentage such as 1%-5%, a precision that may be difficult to achieve with a continuous control gesture such as a touch on and a drag of a draggable UI control element.

In this disclosure, a "hand gesture" refers to a mid-air hand gesture in which a human hand has assumed a particular configuration or the human hand has moved in a particular way in mid-air. In the present disclosure, the terms "mid-air gesture", "hand gesture", and "gesture" shall be used interchangeably to refer to a gesture performed by a user's hand within the field of view of a camera, as described in further detail below.

Figure 3:
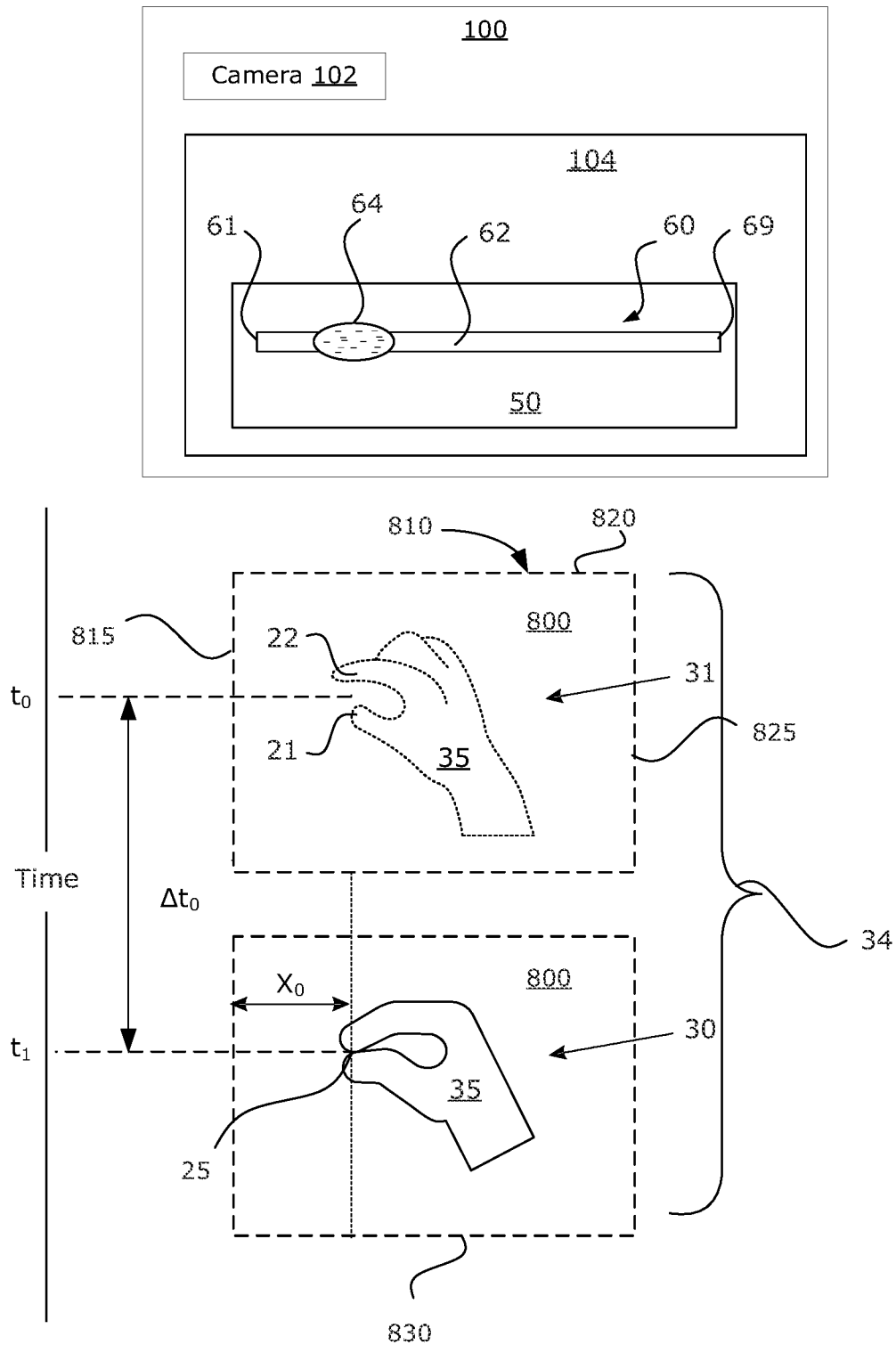
FIG. 3 is a diagram of a gesture-controlled device similar to the one in FIG. 2 showing a slider on the display thereof, the gesture-controlled device shown capturing and recognition of a dynamic dragging mode activation hand gesture, in accordance with embodiments of the present disclosure.

In this disclosure, a "static hand gesture" is a gesture performed by a human hand, in which the human hand persists in the same position, has the same orientation, and the fingers of the human hand have the same configuration for a duration of time. For example, a "pinched open" hand gesture is a static hand gesture in which the human hand is maintained in an "pinch open" hand configuration in the same position with the same orientation and the same configuration of its fingers for a duration of time, such as for a few seconds. A "pinched closed" hand gesture is a static hand gesture in which the human hand is maintained in a "pinch-closed" hand configuration in the same position with the same orientation and the same configuration of its fingers for a duration of time, such as for a few seconds. FIG. 3 shows a human hand 35 (hereinafter hand 35) in a "pinch open" hand configuration 31 and in a "pinch-closed" hand configuration 30. In the "pinch open" hand configuration 31, a tip of the thumb 21 and a tip of the index finger 22 of the hand 35 are spaced apart and not touching. In the "pinch-closed" hand configuration 30, the tip of the thumb 21 and the tip of the index finger 22 of the hand 35 are touching (i.e. not spaced apart).

In this disclosure, a "dynamic hand gesture" is a gesture performed by the hand 35 during which the hand 35 changes its position in space, the hand 35 changes its orientation in space, or the fingers of the hand 35 change their configuration in space over a duration of time. An example of a "dynamic hand gesture" is a dragging hand gesture. A dragging hand gesture comprises a hand 35 having a particular orientation and configuration (e.g., a pinch open hand configuration 31 or a pinch-closed hand configuration 30) and the hand 35 moving in space in a generally horizontal or generally vertical direction, relative to a video frame 800 containing an image of the hand 35, over a duration of time.

Figure 10:
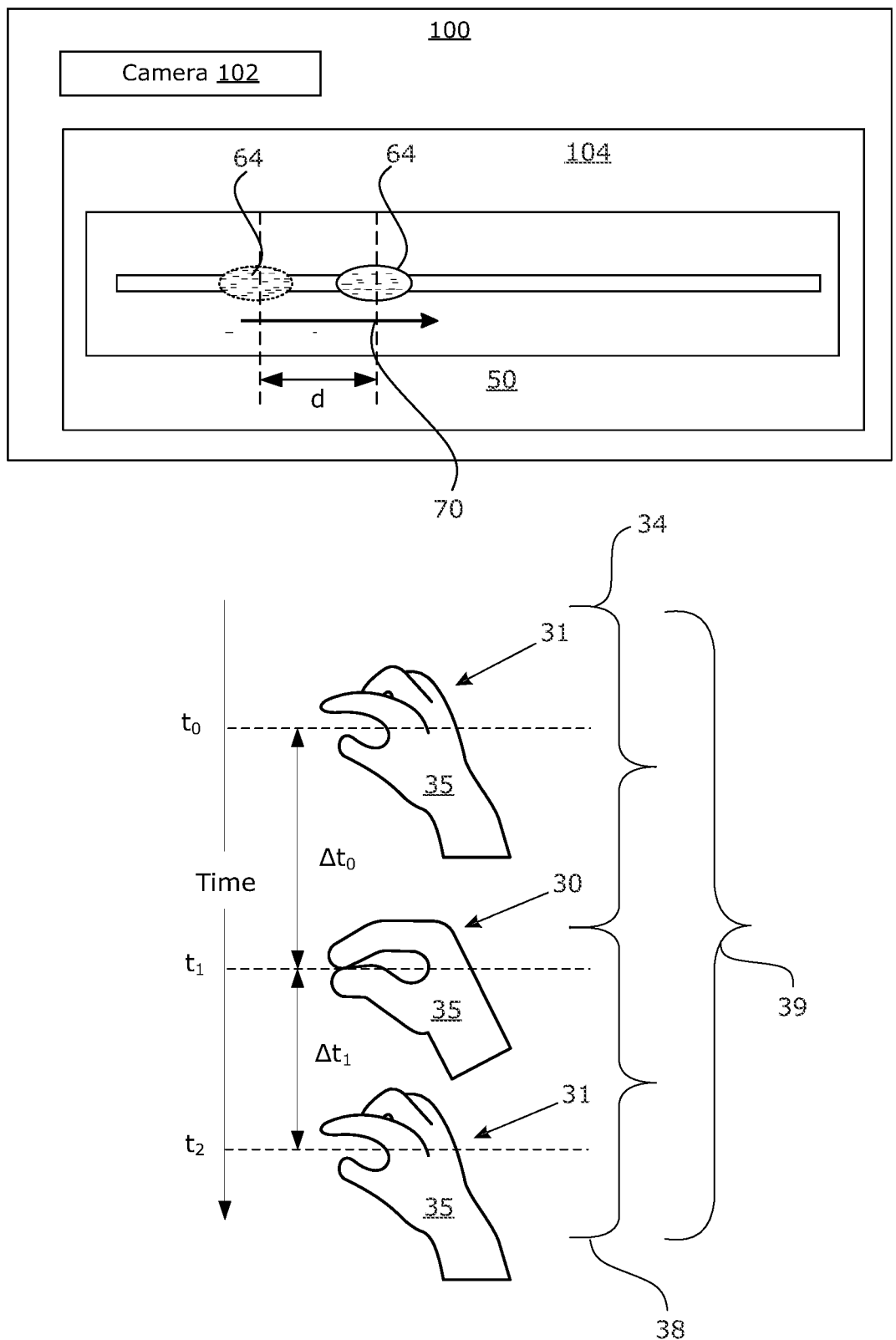
FIG. 10 is a diagram of the gesture-controlled device of FIG. 3 shown capturing and recognition of another dynamic discrete control hand gesture which advances a slider element of the slider in the left direction, in accordance with other embodiments of the present disclosure.

Another example of a "dynamic hand gesture" is a "pinching hand gesture". A "pinching hand gesture" may be "pinch close hand gesture" or a "pinch open hand gesture". FIG. 3 shows an example of a "pinch close hand gesture". A "pinch close hand gesture" involves a hand 35 starting in a pinch open hand configuration 31 at a time $t_0$, the index finger 22 and the thumb 21 of the hand 35 moving towards each other during $\Delta t_0$, and the index finger 22 and the thumb 21 touching each other at time $t_1$. The hand 35 has a "pinch-closed hand configuration" 30 at a time $t_1$. FIG. 10 shows an example of a "pinch open hand gesture" 38. A "pinch open hand gesture" comprises a hand 35 starting in a "pinch-closed hand configuration" 30 at a time $t_1$, the index finger 22 and the thumb 21 moving away each other during $\Delta t_1$, and the index FIG. 22 and the thumb 21 being spaced apart and not touching each other at time $t_2$. The hand 35 in a pinch open hand configuration 31 at a time $t_2$.

A dynamic hand gesture may also include a dragging hand gesture followed by a pinching hand gesture, a pinching hand gesture followed by a dragging hand gesture, or multiple pinching hand gestures.

In this disclosure, a "discrete control hand gesture" may be any type of static or dynamic hand gesture. Recognition of a "discrete control gesture" when a dragging mode for a UI control element is activated causes a draggable element of the UI control element displayed on a display of a gesture-controlled device to be adjusted (e.g. moved) by a discrete distance on the display as described in further detail below.

In this disclosure, a "direction setting hand gesture" may be any type a static or a dynamic hand gesture. When a gesture-controlled device recognizes a direction setting hand gesture, the gesture-controlled device controls a direction of movement of a draggable element (e.g. a widget) of a UI control element.

In this disclosure, "dragging mode" is a user input mode for a UI control element to enable interaction with and manipulation of a draggable element of the UI control element.

In this disclosure, a slider element 64 of a slider 60 is an example of a draggable element (e.g. widget) of a UI control element. The slider element 64 is "dragged" when it is moved along a track 62 of the slider 60. For example, a slider element 64 moves along the track by a discrete amount in response to recognition of a dynamic discrete control hand gesture as described in further detail below. In this disclosure, a rotating element 82 of a rotary dial is another example of a draggable element (e.g. a widget) of a UI control element. In response to recognition of a dynamic discrete control hand gesture, a component of a gesture-controlled device 100, such as a UI control module 230, causes the rotating element 82 to rotate around an axis from a first radial position to a second radial position, in either a clockwise or a counter clockwise direction.

With reference to FIG. 1, an example of a user 10 interacting with a gesture-controlled device 100 is shown. In this simplified diagram, the gesture-controlled device 100 includes an image-capturing device in the form of a digital camera 102 that captures a plurality of video frames (images) in a field-of-view (FOV) 20 of the digital camera 102. The FOV 20 may include at least a portion of the user 10, in particular a face and a hand of the user 10, performing a mid-air hand gesture as discussed further below. Notably, the FOV 20 in real-life use (e.g., outside of a laboratory setting) typically includes more than just the user 10. For example, the FOV 20 may also include other objects, a background scene, or possible other humans. The gesture-controlled device 100 may execute instructions, which direct the digital camera 102 to capture video frames 800 of the user's hand 35 to capture and process mid-air hand gestures, as will be described below. For example, the digital camera 102 may be turned towards the user's hand 35, zoomed in on the user's hand 35, or the captured video frames 800 by the digital camera 102 may be cropped to provide captured video frames 800 of the user's hand 35. The gesture-controlled device 100 may, instead of or in addition to the digital camera 102, include another sensor capable of sensing mid-air hand gestures performed by the user 10, for example, any image-capturing device/sensor (e.g., an infrared image sensor). Additionally, the gesture-controlled device 100 includes a combination of hardware and software components, which process the captured video frames to recognize different mid-air hand gestures performed by the user 10. The gesture-controlled device 100 also includes a display device 104 (hereinafter referred to as display 104) for displaying visual information thereon, such as a video and a user interface that includes draggable UI elements. A more detailed block diagram showing the components of the gesture-controlled device 100 is described below with reference to FIG. 2.

Figure 2:
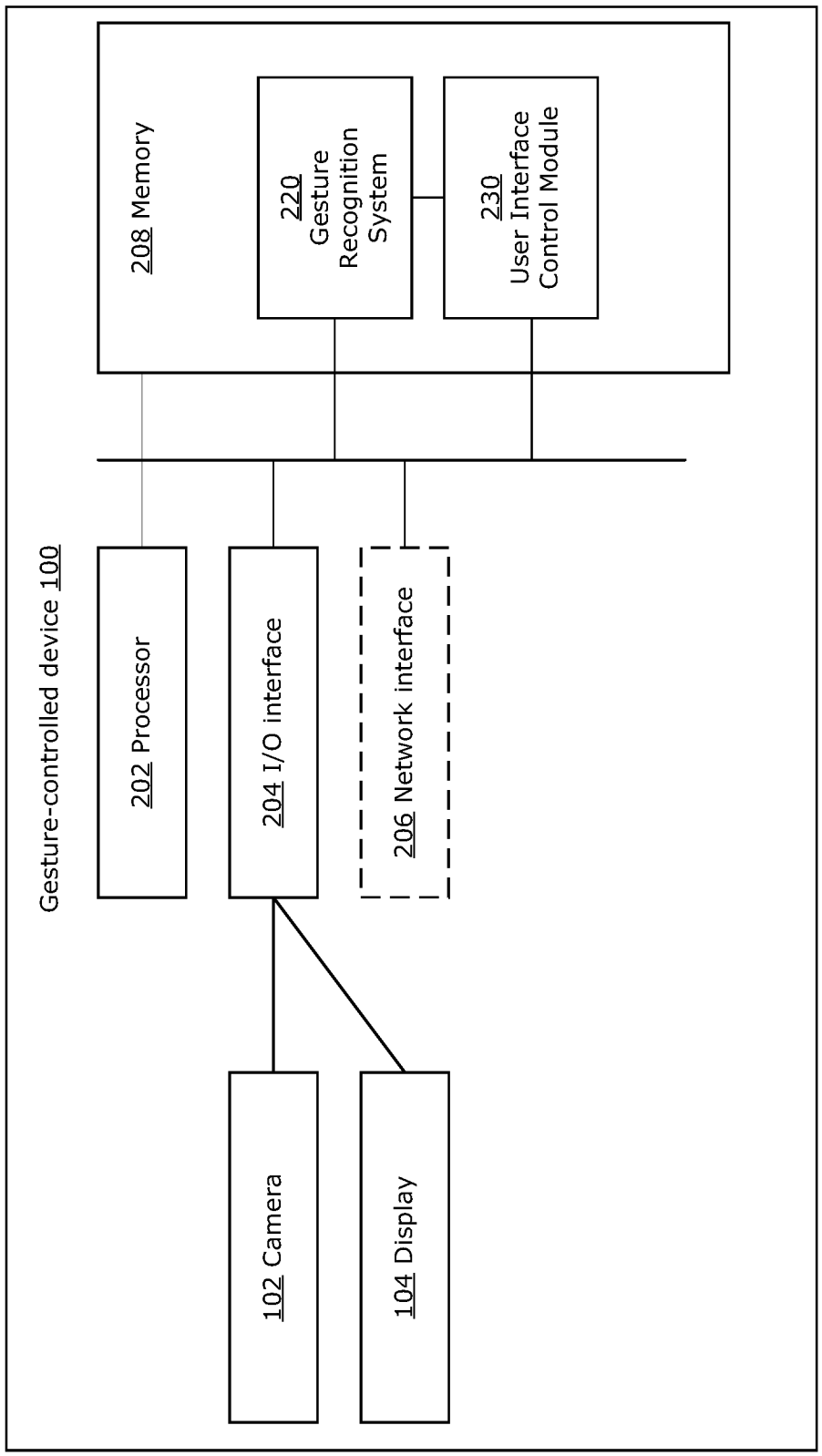
FIG. 2 is a block diagram illustrating some components of an example of the gesture-controlled device of FIG. 1 in accordance with embodiments of the present disclosure.

Referring to FIG. 2, a block diagram of the gesture-controlled device 100 is shown. Although an example embodiment of the gesture-controlled device 100 is shown and discussed below, other embodiments may be used to implement examples disclosed herein, which may include components different from those shown. Although FIG. 2 shows a single instance of each component of the gesture-controlled device 100, there may be multiple instances of each component shown.

The gesture-controlled device 100 includes one or more processors 202, such as a central processing unit, a microprocessor, an application-specific integrated circuit (ASIC), a field-programmable gate array (FPGA), a dedicated logic circuitry, a tensor processing unit, a neural processing unit, a dedicated artificial intelligence processing unit, or combinations thereof. The gesture-controlled device 100 also includes one or more input/output (I/O) interfaces 204, which interfaces input devices such as the digital camera 102 and output devices such as the display 104. The gesture-controlled device 100 may include other input devices (e.g., buttons, microphone, touchscreen, keyboard, etc.) and other output devices (e.g., speaker, vibration unit, etc.). The digital camera 102 (or other input device) may have capabilities for capturing live gesture input as a sequence of video frames. The captured video frames may be buffered by the I/O interface(s) 204 and provided to the processor(s) 202 to be processed in real-time or near real-time (e.g., within 100 ms).

The gesture-controlled device 100 may include one or more optional network interfaces 206 for wired or wireless communication with a network (e.g., an intranet, the Internet, a peer-to-peer (P2P) network, a wide area network (WAN) and/or a local area network (LAN)) or other node. The network interface(s) 206 may include wired links (e.g., Ethernet cable) and/or wireless links (e.g., one or more antennas) for intra-network and/or inter-network communications.

The gesture-controlled device 100 includes one or more memories 208, which may include a volatile or non-volatile memory (e.g., a flash memory, a random access memory (RAM), and/or a read-only memory (ROM)). The non-transitory memory(ies) 208 may store instructions for execution by the processor(s) 202, such as to carry out examples described in the present disclosure. The memory(ies) 208 may include other software instructions, such as for implementing an operating system and other applications/functions. The gesture recognition system 220 is a software module, component or system, residing in the memory 208, and is configured to obtain the frames of a video captured by the digital camera and to process the obtained video frames using image processing and recognition methods to recognize a plurality of pre-defined types of mid-air hand gestures therein. For example, the gesture recognition system 220 may implement a trained machine-learning model, which receives frames of a video captured by the digital camera 102 and processes the frames of the video to recognize mid-air hand gestures therein. The machine-learning model is trained using a training dataset, a supervised learning algorithm, and a loss function to learn parameters of the machine-learning model. The training dataset includes a plurality of labeled training samples where each labeled training sample is an input-output pair that includes a frame (i.e. digital video) that contains a mid-air hand gesture performed by a user and a ground truth label identifying a type of mid-air hand gesture performed by the user. In some embodiments, the machine-learning model may be a trained neural network model, such as a trained convolutional neural network (CNN) model that is configured to recognize a mid-air gestures performed by a user in a plurality of frames of a video captured by the digital camera 102. A trained convolutional neural network (CNN) that approximates a trained machine-learning model is generally referred to as a trained CNN model. A trained CNN model includes weights and biases learned during training of the CNN.

The gesture recognition system 220 is coupled to the UI control module 230 and provides recognized hand gestures to the UI control module 230. The UI control module 230 configures a UI control element, by moving the draggable element (e.g. a draggable widget) of the UI control element, upon receipt of hand gestures from the gesture recognition system 220 as described in further detail below. While in the example shown in FIG. 2, the gesture recognition system 220 and the UI control module 230 are shown as separate components, in other examples they may be integrated together in a single module.

In some examples, the gesture-controlled device 100 may also include one or more electronic storage units (not shown), such as a solid state drive, a hard disk drive, a magnetic disk drive and/or an optical disk drive. In some examples, one or more data sets and/or modules may be provided by an external memory (e.g., an external drive in wired or wireless communication with the gesture-controlled device 100) or may be provided by a transitory or non-transitory computer-readable medium. Examples of non-transitory computer readable media include a RAM, a ROM, an erasable programmable ROM (EPROM), an electrically erasable programmable ROM (EEPROM), a flash memory, a CD-ROM, or other portable memory storage. The components of the gesture-controlled device 100 may communicate with one another via a bus, for example.

In some embodiments, a distributed system may include multiple gesture-controlled devices 100 as well as optionally one or more additional components. The distributed system may include multiple gesture-controlled devices 100 in communication with one another over a network. In some embodiments, the distributed system is an augmented reality system that includes a single gesture-controlled device 100, multiple digital cameras (e.g. a digital camera array positioned around a physical space) and a single head-mounted display. In this embodiment, the single gesture-controlled device 100 is configured to process frames of a video captured by the multiple digital cameras of the distributed system to recognize mid-air hand gestures performed by a user of the gesture-controlled device 100. The gesture-controlled device 100 discretely controls (e.g. moves) a draggable UI element displayed by the head mounted display based on the recognized mid-air hand gestures as described in further detail below. It will be appreciated that these distributed systems are provided as examples, and that other distributed systems are possible.

It will be appreciated that different embodiments may include different combinations of input and output devices in place of, or in addition to, the digital camera 102 and display 104. Feedback information may be provided to the user of such a VR or AR system by displaying, movement of the draggable UI control element using the head-mounted display.

In some embodiments, a distributed system may be a VR or AR system that includes multiple digital cameras 102 that capture videos containing frames (i.e. digital images) of different users performing mid-air hand gestures. For example, a VR or AR system may include a separate digital camera mounted on each user's headset or other VR or AR device, with each user's respective digital camera used to capture video containing frames of the respective user performing mid-air hand gestures. The VR or AR system with multiple users located remotely from one another could use digital cameras local to each user to capture that user's body and environment in order to capture a video of that user performing a mid-air hand gestures. In such an example multi-camera embodiment, the methods and systems described herein could be used to detect, track, and recognize each user's mid-air hand gestures by combining the frames captured by each digital camera. This plurality of frames received from multiple digital cameras could be combined temporally in some embodiments (e.g. processing each frame for gesture recognition sequentially), spatially in some embodiments (e.g. creating a composite video frame encompassing the current frame from each digital camera, and processing the composite frame for gesture recognition), or by some other method of combining frames from multiple digital cameras.

Referring now to FIG. 3, there is shown a gesture-controlled device 100 having a display 104 on which there is displayed at least a portion of a user interface 50 of a media application. The portion of the user interface 50 includes a UI control element that is a slider 60. The slider 60 is used to control a system parameter, such as audio volume, brightness or contrast of the display 104, while the gesture-controlled device 100 is running the media application. The system parameter associated with the slider 60 is adjusted (e.g. moved) by the UI control module 230 by moving a slider element 64 of the slider 60 along a track 62 of slider 60. The system parameter is set to its minimum possible value when the slider element 64 is at the left end 61 of the track 62. The system parameter associated with the slider 60 is set to its maximum possible value when the slider element 64 is at the right end 69 of the track 62.

Discrete adjustments of the system parameter associated with the slider 60 are enabled upon activation of a dragging mode for the slider 60 by the gesture-controlled device 100. In some embodiments, the UI control module 230 activates the dragging mode for the slider 60 when the gesture recognition system 220 recognizes a dynamic dragging mode activation hand gesture within frames 800 of a video captured by the digital camera 102 of the gesture-controlled device 100. In the embodiment shown in FIG. 3, each frame 800 has a border 810 including a left edge 815, a top edge 820, a right edge 825 and a bottom edge 830. In an example embodiment, the dragging mode activation hand gesture is a dynamic pinch close hand gesture 34. In the depicted embodiment, the gesture recognition system 220 recognizes a dynamic pinch close hand gesture 34 when an initial pinch open hand configuration 31 of the hand 35 is detected at $t_0$, followed by a pinch-closed configuration 30 of the hand 35 at time $t_1$. During the pinch close hand gesture 34, two fingers, such as a thumb 21 and an index finger 22, of the hand 35 of a user of the gesture-controlled device 100 are moved towards one another until their respective tips are touching. As shown in FIG. 3, the hand 35 is shown at the initial time $t_0$ in dotted lines in a pinch open hand configuration 31. After a time $\Delta t_0$ has elapsed, the hand 35 of the user is shown in solid lines as a pinch-closed hand configuration 30. When the gesture recognition system 220 recognizes the dragging mode activation hand gesture (e.g. dynamic pinch close hand gesture 34), the gesture recognition system 220 provides the dragging mode activation hand gesture to the UI control module 230 which activates a dragging mode for the slider 60. Upon the UI control module 230 activating the dragging mode for the slider 60, the gesture recognition system 220 determines a distance between a point on the hand 35 and a point of reference in the last frame 800 of the captured frames 800. For example, in the depicted embodiment, the gesture recognition system 220 determines the distance between the left edge 815 of the last frame 800 of the frames 800 and the point of contact 25 between the thumb 21 and index finger 22 of the hand 35. This distance marks the initial position of the hand 35 of the user represented as an initial horizontal distance $X_0$.

In some embodiments, the dragging mode activation gesture further comprises a dynamic pinch open hand gesture. In these embodiments, the gesture recognition system 220 recognizes a dragging mode activation gesture when the hand 35 of the user, returns to a pinch open hand configuration 31 after being in a pinch-closed hand configuration 30. In other embodiments, the time $\Delta t_0$ is greater or equal to an activation duration $T_A$.

In other embodiments, the dragging mode activation hand gesture that causes activation of a dragging mode for a UI control element, such as slider 60, may be any suitable dynamic hand gesture that is recognizable by the gesture recognition system 220. In some embodiments, the gesture recognition system 220 measures the initial position of the hand 35 of a user, represented as the initial horizontal distance $X_0$, relative to the right edge 825 of the last frame 800 of the frames 800 or relative to any other suitable point of reference in the last frame 800 of the frames 800.

In other embodiments, the dragging mode activation gesture that causes activation of a dragging mode for a UI control element, such as slider 60, may be any suitable static hand gesture that is recognizable by the gesture recognition system 220. The gesture recognition system 220 may recognize a static hand gesture, such as a static pinched open hand gesture when a pinch open hand configuration 30 for the user's hand 35 is recognized in the frames 800 for an activation duration, denoted $T_A$. Alternatively, gesture recognition system 220 may recognize a static pinch closed hand gesture when a pinch-closed hand configuration 31 for the user's hand 35 is recognized in frames 800 for an activation duration, denoted $T_A$.

Figure 4:
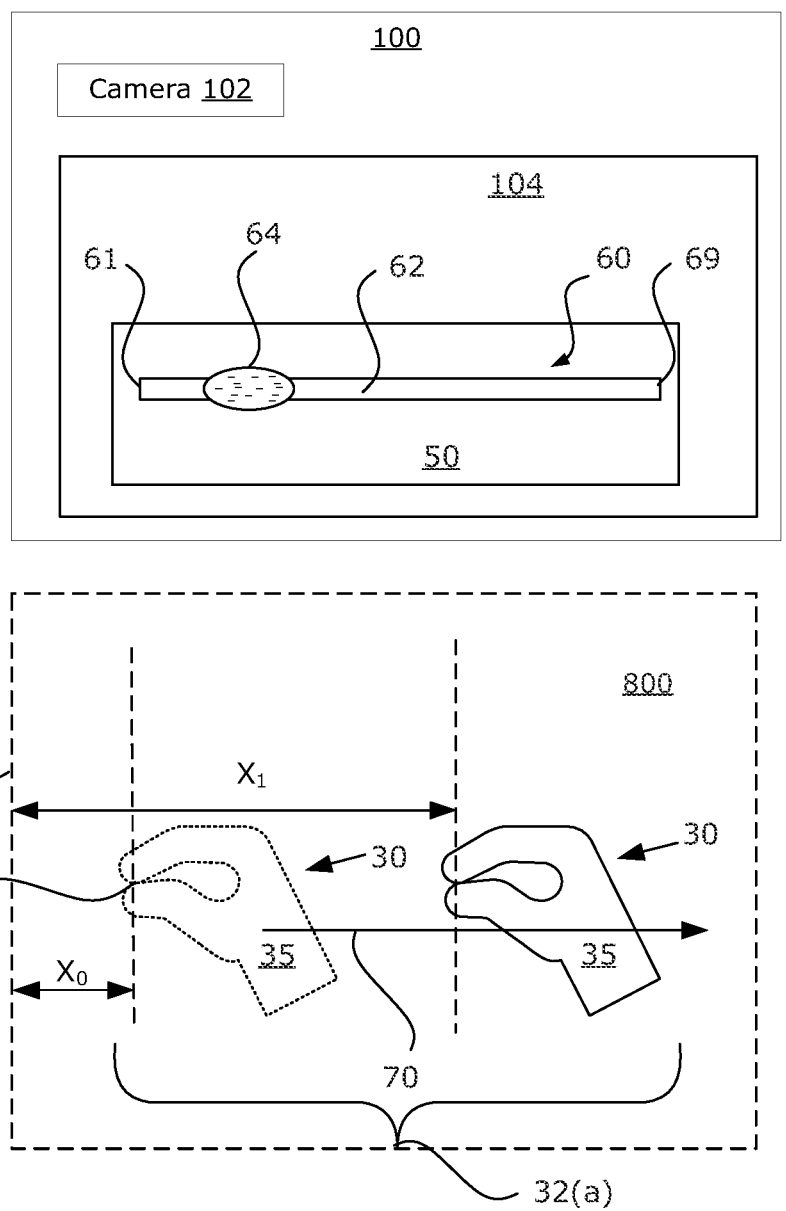
FIG. 4 is a diagram of the gesture-controlled device of FIG. 3 shown capturing and recognition of a dynamic generally horizontal hand gesture for setting the default dragging direction for the slider to the right direction, in accordance with embodiments of the present disclosure.

After the UI control module 230 activates a dragging mode for a UI control element (e.g. the slider 60), the UI control module 230 may configure a default dragging direction for the draggable element (e.g. the slider element) of the UI control element (e.g. the slider 60). The default dragging direction for the UI control element is the direction in which the dragging element (e.g. the slider element 64) of the UI control element (e.g. slider 60) moves in discrete steps in response to recognition of dynamic discrete control hand gestures. In some example embodiments, the default dragging direction is set when the gesture recognition system 220 recognizes a dynamic dragging hand gesture (see FIGS. 4-7). For example, with reference to FIG. 4, a dynamic dragging hand gesture 32(*a*) performed by a user to set the default dragging direction to the right is shown. The hand 35 of a user, shown in dotted lines, is in an initial position defined by the distance $X_0$ from the left edge 815 of the frame 800. The user then performs a dynamic dragging hand gesture 32(*a*) by moving their hand 35 in a generally horizontal direction to the right. The gesture-recognition system 220, upon recognition of the dragging hand gesture 32(*a*), provides the dragging hand gesture 32(*a*) to the UI control module 230, which sets the default dragging direction to the right as shown in FIG. 4. When a user performs the dynamic dragging hand gesture 32(*a*), the hand 35 is first in a pinch-closed hand configuration 30. The user then drags their hand 35 in the right direction 70 until their hand 35 is at a subsequent position defined by the subsequent horizontal distance $X_1$ from the left edge 815 of the frame 800 as shown in FIG. 4. In the second position, the hand 35 of the user is shown in solid lines. The gesture recognition system 220 receives frames 800 of a video captured by the digital camera 102 as the user performs the dynamic dragging mid-air hand gesture 32(*a*). The gesture recognition system 220 processes the frames 800, recognizes that the user performed a dynamic dragging mid-air hand gesture 32(*a*) in the frames 800, and determines that the user's hand 35 has moved to the right during the dynamic dragging hand gesture 32(*a*). For example, the gesture recognition system 220 compares the initial horizontal distance $X_0$ and the subsequent horizontal distance $X_1$. In the embodiment shown in FIG. 4, $X_1$ is greater than $X_0$ indicating that the hand 35 of the user has moved to the right during the dynamic dragging gesture 32(*a*). After the gesture recognition system 220 recognizes a dynamic dragging hand gesture 32(*a*) and determines the direction of the dynamic dragging hand gesture 32(*a*), the gesture recognition system 220 provides the recognized dynamic dragging hand gesture 32(*a*) and the direction of the dynamic dragging gesture 32(*a*) to the UI control module 230. The UI control module 230 sets the default dragging direction for the UI control element (e.g. the slider 60) to the right (or forward) direction 70. If the difference between the initial and subsequent positions is below a particular threshold, the default dragging direction is not set. The slider 60 shown in FIG. 4 is a horizontal slider. In some embodiments, the slider 60 is a vertical slider relative to the display 104. In such embodiments, when the subsequent distance $X_1$ is greater than the initial distance $X_0$, the gesture recognition system 220 may determine that the direction of the dynamic dragging gesture 32(*a*) is in an upward direction.

Figure 5:
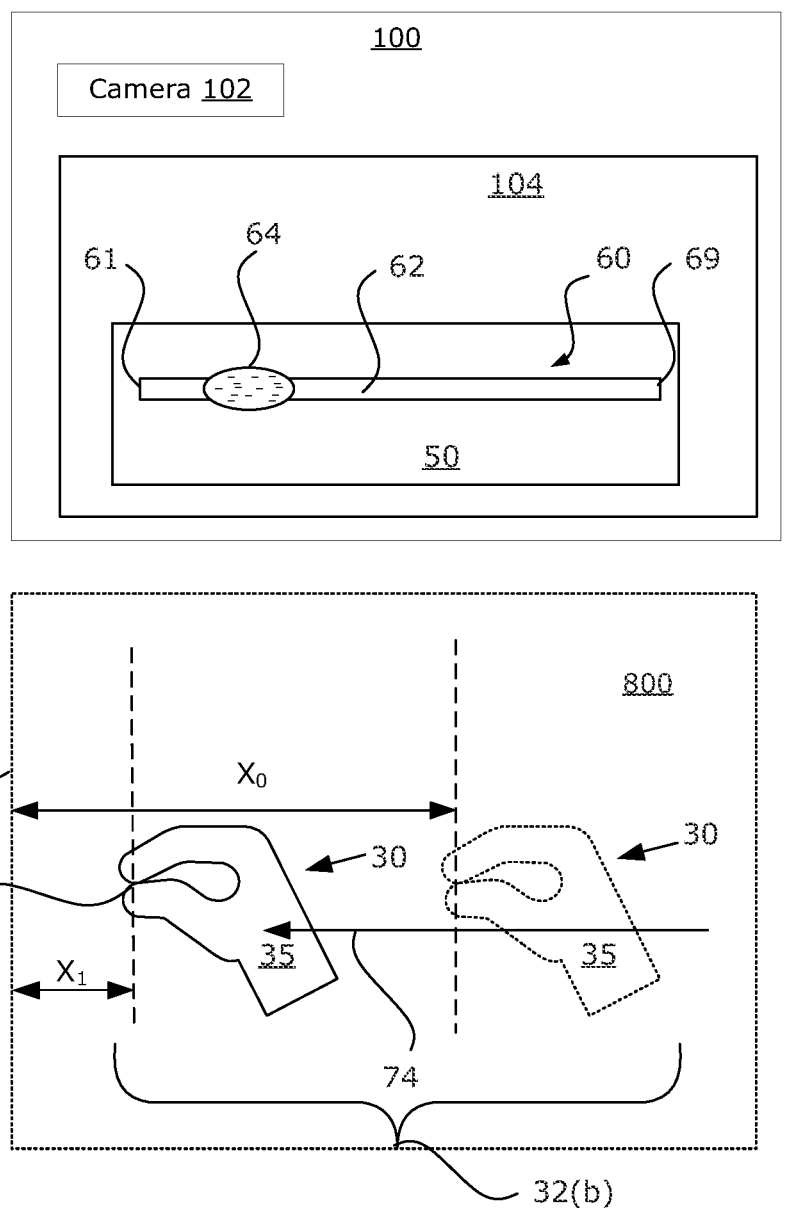
FIG. 5 is a diagram of the gesture-controlled device of FIG. 3 shown capturing and recognition of a dynamic generally horizontal hand gesture for setting the default dragging direction for the slider to the left direction, in accordance with embodiments of the present disclosure.
Figure 6:
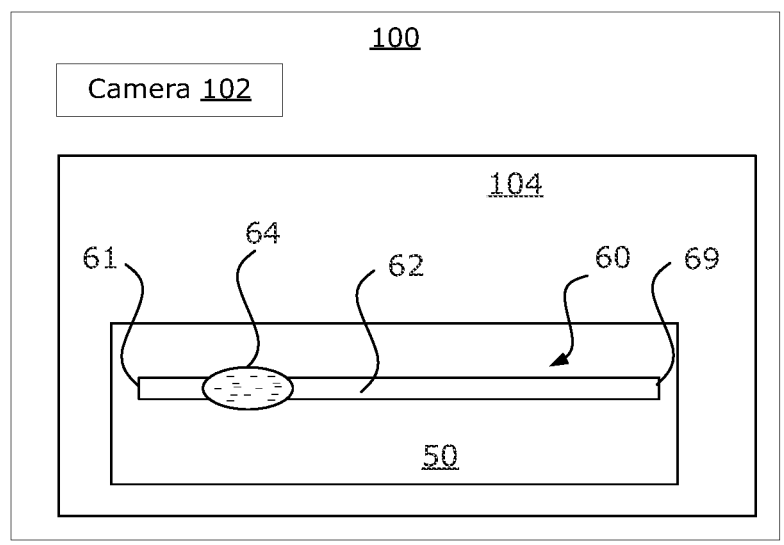
FIG. 6 is a diagram of the gesture-controlled device of FIG. 3 shown capturing and recognition of a dynamic generally vertical hand gesture for setting the default dragging direction for the slider to the right direction, in accordance with embodiments of the present disclosure.
Figure 6:
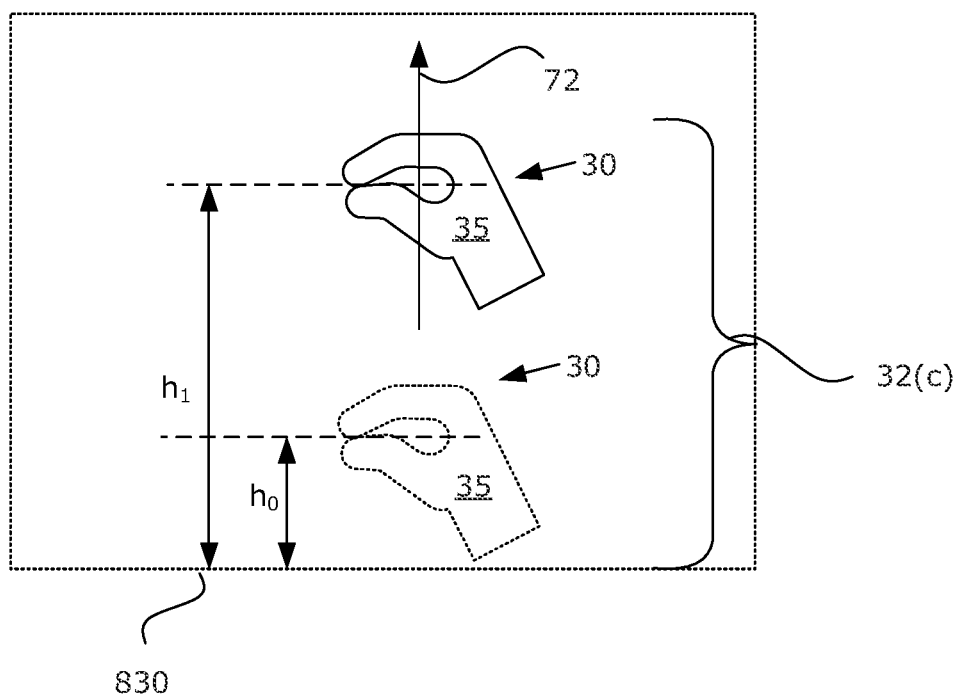

The default dragging direction can also be set to the left (or backward) direction 74. Referring to FIG. 5, a dynamic dragging hand gesture 32(*b*) performed by a user to set the default dragging direction to the left is shown. The hand 35 of the user, shown in dotted lines, is in an initial position defined by the distance $X_0$ from the left edge 815 of the frame 800. The user then performs a dynamic dragging hand gesture 32(*b*) by moving their hand 35 in a generally horizontal direction to the left. The gesture recognition system 220, upon recognition of the dragging hand gesture 32(*b*), provide the dragging hand gesture 32(*b*) to the UI control module 230, which sets the default dragging direction to the left as shown in FIG. 5. When a user performs the dynamic dragging hand gesture 32(*b*), the hand 35 is first in a pinch-closed hand configuration 30. The user then drags their hand 35 in the left direction 74 until their hand 35 is at a subsequent position defined by the subsequent horizontal distance $X_1$ from the left edge 815 of the frame 800 as shown in FIG. 5. In the second position, the hand 35 of the user is shown in solid lines. The gesture recognition system 220 receives frames 800 of a video captured by the digital camera 102 as the user performs the dynamic dragging mid-air hand gesture 32(*b*). The gesture recognition system 220 processes the frames 800, recognizes that the user performed a dynamic dragging mid-air hand gesture 32(*b*) in the frames 800, and determines that the user's hand 35 has moved to the left during the dynamic dragging hand gesture 32(*b*). For example, the gesture recognition system 220 compares the initial horizontal distance $X_0$ and the subsequent horizontal distance $X_1$. In the embodiment shown in FIG. 5, $X_0$ is greater than $X_1$ indicating that the hand 35 of the user has moved to the left during the dynamic dragging gesture 32(*b*). After the gesture recognition system 220 recognizes a dynamic dragging hand gesture 32(*b*) and determines the direction of the dynamic dragging hand gesture 32(*b*), the gesture recognition system 220 provides the recognized dynamic dragging hand gesture 32(*b*) and the direction of the dynamic dragging gesture 32(*b*) to the UI control module 230. The UI control module 230 sets the default dragging direction for the UI control element (e.g. the slider 60) to the left (or backward) direction 74. If the difference between the initial and subsequent positions is below a particular threshold, the default dragging direction is not set. The slider 60 shown in FIG. 5 is a horizontal slider. In some embodiments, the slider 60 is a vertical slider relative to the display 104. In such embodiments, when the subsequent distance $X_1$ is smaller than the initial distance $X_0$, the gesture recognition system 220 may determine that the direction of the dynamic dragging gesture 32 is in a downward direction For the purposes of the present disclosure, the terms "upwards", "downwards", "leftwards" and "rightwards" are used herein in reference to a frame 800 of a video captured by digital camera 102 of the gesture-controlled device 100 as shown in FIGS. 4-6.

Other embodiments for setting of a default dragging direction for a UI control element are contemplated. For example, with reference to FIGS. 6 and 7, the default dragging direction for a UI control element (e.g. the slider 60) can be set by a dynamic dragging hand gesture 32(*c*), 32(*d*) performed in generally vertical direction after the dragging mode has been activated for the UI control element (e.g. slider 60). For example, with reference to FIG. 6, a dynamic dragging hand gesture 32(*c*) is performed by a user to set the default dragging direction to the right is shown. The hand 35 of a user, shown in dotted lines, is in an initial position defined by the vertical distance (height) $h_0$ from the bottom edge 830 of the frame 800. The user then performs a dynamic dragging hand gesture 32(*c*) by moving their hand 35 in a generally vertical upward direction 72, relative to a point of reference in the frame 800 such as the bottom edge 830. The gesture-recognition system 220, upon recognition of the dragging hand gesture 32(*c*), provides the dragging hand gesture 32(*c*) to the UI control module 230, which sets the default dragging direction to the right. When a user performs the dynamic dragging hand gesture 32(*c*), the hand 35 is first in a pinch-closed hand configuration 30. The user then drags their hand 35 in the upward direction 72 until their hand 35 is at a subsequent position defined by the subsequent height $h_1$ from the bottom edge 830 of the frame 800 as shown in FIG. 6. In the second position, the hand 35 of the user is shown in solid lines. The gesture recognition system 220 receives frames 800 of a video captured by the digital camera 102 as the user performs the dynamic dragging mid-air hand gesture 32(c). The gesture recognition system 220 processes the frames 800, recognizes that the user performed a dynamic dragging mid-air hand gesture 32(c) in the frames 800, and determines that the user's hand 35 has moved upwards during the dynamic dragging hand gesture 32(c). For example, the gesture recognition system 220 compares the initial height $h_0$ and the subsequent height $h_1$. In the embodiment shown in FIG. 6, $h_1$ is greater than $h_0$ indicating that the hand 35 of the user has moved upwards during the dynamic dragging gesture 32(c). After the gesture recognition system 220 recognizes a dynamic dragging hand gesture 32(c) and determines the direction of the dynamic dragging hand gesture 32(c), the gesture recognition system 220 provides the recognized dynamic dragging hand gesture 32(c) and the direction of the dynamic dragging gesture 32(c) to the UI control module 230. In this case, the UI control module 230 is configured to set the default dragging direction to the right if the recognized dynamic dragging gesture is in the upward direction. Accordingly, the UI control module 230 sets the default dragging direction for the UI control element (e.g. the slider 60) to the right (or forward) direction 70. If the difference between the initial and subsequent positions is below a particular threshold, the default dragging direction is not set. The slider 60 shown in FIG. 6 is a horizontal slider. In some embodiments, the slider 60 is a vertical slider relative to the display 104. In such embodiments, when the subsequent height $h_1$ is greater than the initial height $h_0$, the gesture recognition system 220 may determine that the direction of the dynamic dragging gesture 32(c) is in an upward direction.

Figure 7:
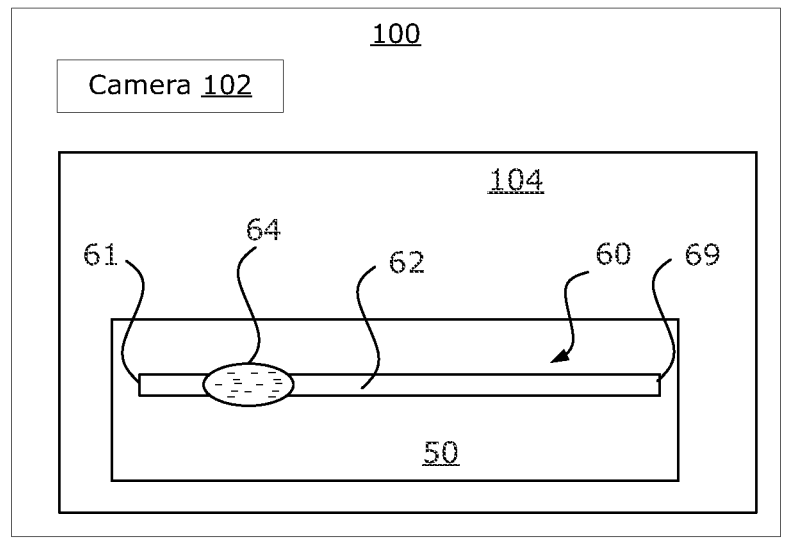
FIG. 7 is a diagram of the gesture-controlled device of FIG. 3 shown capturing and recognition of a dynamic generally vertical hand gesture for setting the default dragging direction for the slider to the left direction, in accordance with embodiments of the present disclosure.
Figure 7:
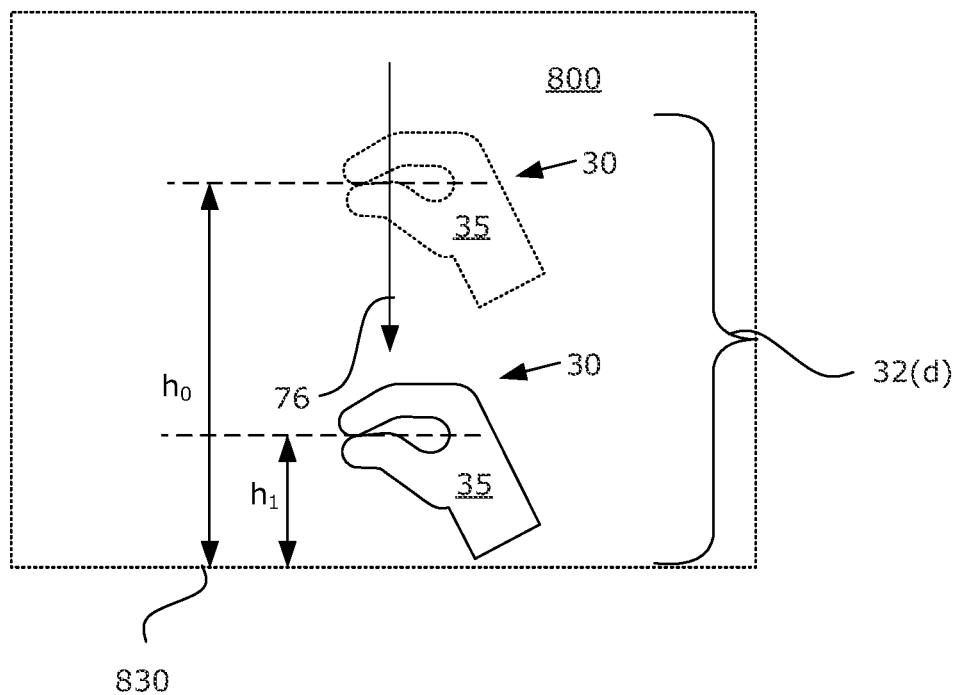

With reference to FIG. 7, a dynamic dragging hand gesture 32(d) is performed by a user to set the default dragging direction to the right is shown. The hand 35 of a user, shown in dotted lines, is in an initial position defined by the vertical distance (height) $h_0$ from the bottom edge 830 of the frame 800. The user then performs a dynamic dragging hand gesture 32(d) by moving their hand 35 in a generally vertical downward direction 76, relative to a point of reference in the frame 800, such as the bottom edge 830. The gesture-recognition system 220, upon recognition of the dragging hand gesture 32(d), provides the dragging hand gesture 32(d) to the UI control module 230, which sets the default dragging direction to the left. When a user performs the dynamic dragging hand gesture 32(d), the hand 35 is first in a pinch-closed hand configuration 30. The user then drags their hand 35 in the downward direction 76 until their hand 35 is at a subsequent position defined by the subsequent height $h_1$ from the bottom edge 830 of the frame 800 as shown in FIG. 7. In the second position, the hand 35 of the user is shown in solid lines. The gesture recognition system 220 receives frames 800 of a video captured by the digital camera 102 as the user performs the dynamic dragging mid-air hand gesture 32(d). The gesture recognition system 220 processes the frames 800, recognizes that the user performed a dynamic dragging mid-air hand gesture 32(d) in the frames 800, and determines that the user's hand 35 has moved downwards during the dynamic dragging hand gesture 32(c). For example, the gesture recognition system 220 compares the initial height $h_0$ and the subsequent height $h_1$. In the embodiment shown in FIG. 7, $h_1$ is smaller than $h_0$ indicating that the hand 35 of the user has moved downwards, relative to the frame 800, during the dynamic dragging gesture 32(d). After the gesture recognition system 220 recognizes a dynamic dragging hand gesture 32(d) and determines the direction of the dynamic dragging hand gesture 32(d), the gesture recognition system 220 provides the recognized dynamic dragging hand gesture 32(d) and the direction of the dynamic dragging gesture 32(d) to the UI control module 230. In this case, the UI control module 230 is configured to set the default dragging direction to the left if the recognized dynamic dragging gesture is in the downward direction relative to the frame 800. Accordingly, the UI control module 230 sets the default dragging direction for the UI control element (e.g. the slider 60) to the left (or backward) direction 70. If the difference between the initial and subsequent positions is below a particular threshold, the default dragging direction is not set. The slider 60 shown in FIG. 7 is a horizontal slider. In some embodiments, the slider 60 is a vertical slider relative to the display 104. In such embodiments, when the subsequent height $h_1$ is smaller than the initial height $h_0$, the gesture recognition system 220 may determine that the direction of the dynamic dragging gesture 32(d) is in a downward direction, relative to the frame 800.

Figure 8:
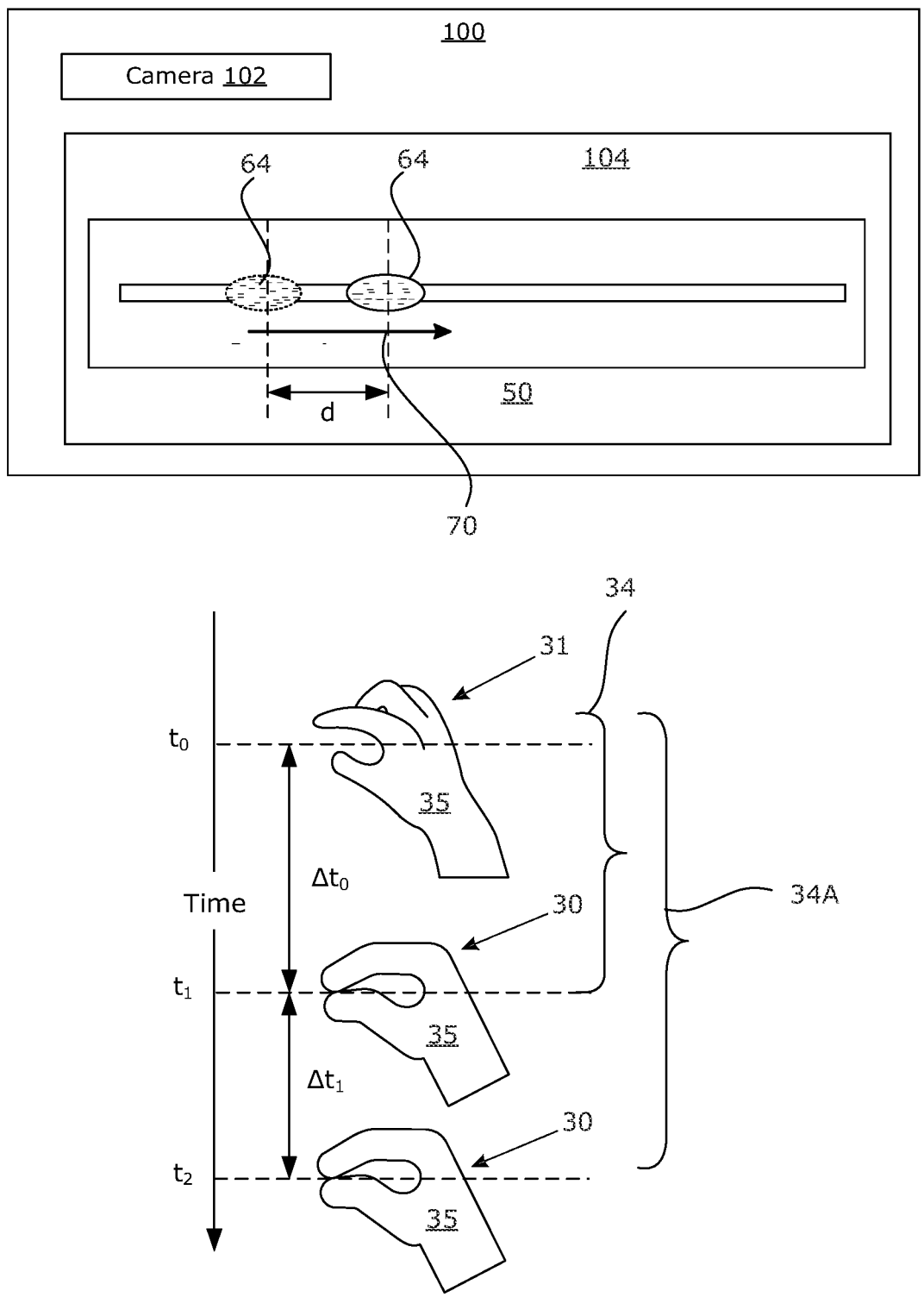
FIG. 8 is a diagram of the gesture-controlled device of FIG. 3 shown capturing and recognition of a dynamic discrete control hand gesture which advances a slider element of the slider in the right direction, in accordance with embodiments of the present disclosure.

Once the UI control module 230 sets the default dragging direction for moving the draggable element (e.g. slider element 64) of the UI control element (e.g. slider 60), the gesture recognition system 220 can recognize dynamic discrete control hand gestures and provide the recognized dynamic discrete control hand gestures to the UI control module 230. The UI control module 230 can trigger discrete movements of the draggable element (e.g. the slider element 64) of the UI control element (e.g. the slider) in the default dragging direction. For example, with reference to FIGS. 8-10, a dynamic discrete control mid-air hand gestures 38 are depicted from $t_0$ to $t_2$. In FIG. 8, the dynamic discrete control gesture is a pinching hand gesture 34A comprised of a pinch close hand gesture 34 (described above) followed by a pinch-closed hand configuration 30 being held for a short duration. Specifically, the dynamic pinching mid-air hand gesture 34A starts with a pinch open hand configuration 31 at $t_0$. The index finger and the thumb of the user's hand 35 move towards each other during a short duration of time $\Delta t_0$ between $t_0$ and $t_1$, and a pinch-closed hand configuration 30 is reached at $t_1$, as is the case with a pinch close hand gesture 34 described earlier. This is followed by the pinch-close hand configuration 30 being held for another short duration $\Delta t_1$ between $t_1$ and $t_2$. The gesture recognition system 220 processes frames 800 including the dynamic discrete control hand gesture, in the form of the dynamic pinching mid-air hand gesture 34A and, upon recognition of the dynamic pinching hand gesture 34A, provides the UI control module 230 with the dynamic pinching hand gesture 34. The UI control module 230, upon receipt of the dynamic discrete control hand gesture, in the form of the dynamic pinching hand gesture 34A, controls the draggable UI element (e.g. the slider element 64) by moving it in the default dragging direction by a discrete distance (d). The discrete distance (d) may be configurable as will be described below. For example, with reference to FIG. 8, the UI module 230 has set the default dragging direction for the draggable element (e.g. the slider element 64) of the UI control element (e.g. the slider 60) to the right direction 70 upon receipt of a dynamic discrete control hand gesture, such as the dynamic pinching gesture 34A, when the UI control element (e.g. the slider 60) has activated dragging mode for the UI control element (e.g. the slider). The UI control module 230 receives the recognized dynamic pinching hand gesture 34A from the gesture recognition system 220 and moves the slider element 64 of the slider 60) from an initial position shown in dotted lines to the right by the discrete distance (d) to a final position shown in solid lines.

Figure 9:
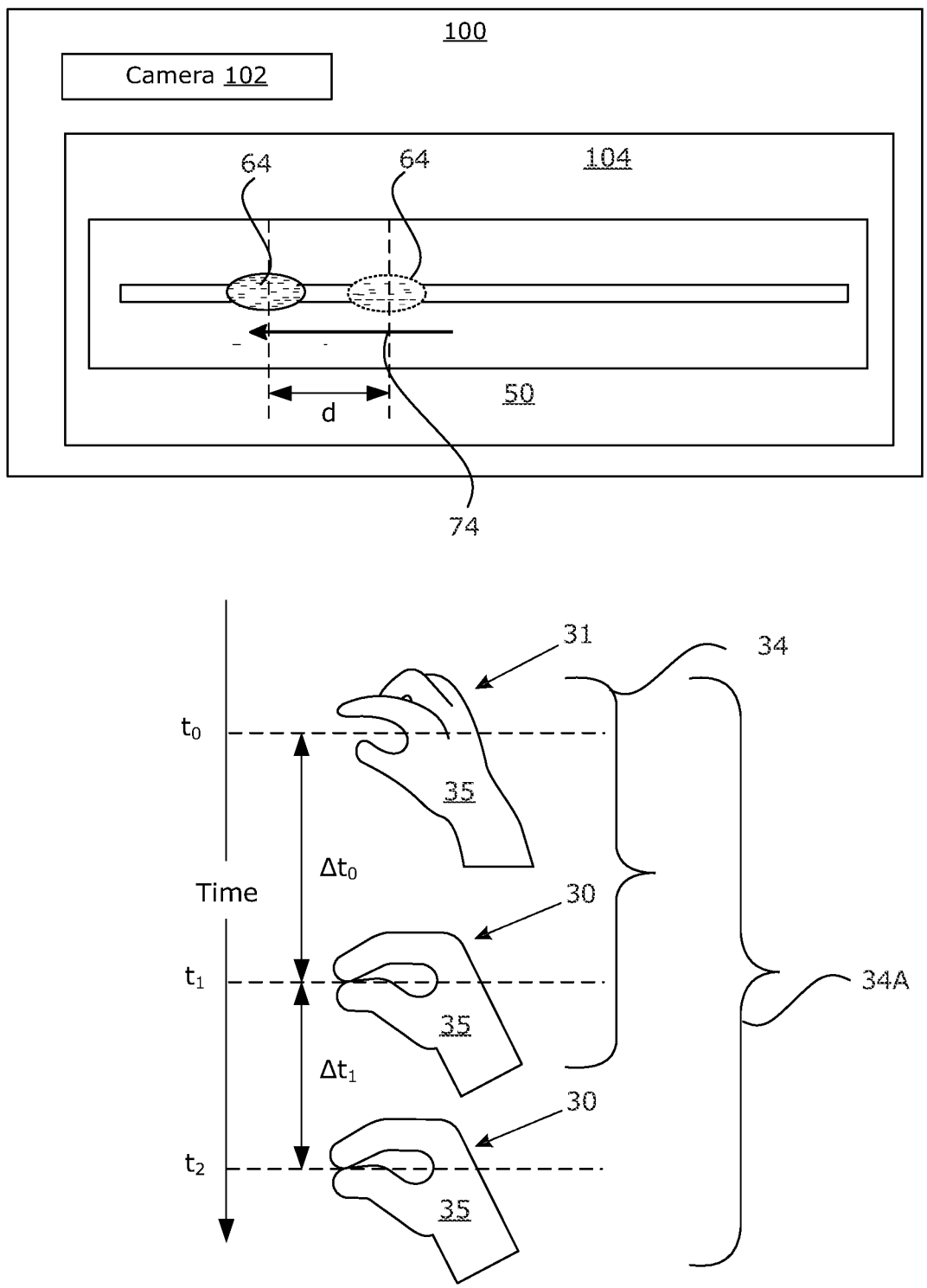
FIG. 9 is a diagram of the gesture-controlled device of FIG. 3 shown capturing and recognition of a dynamic discrete control hand gesture which advances a slider element of the slider in the left direction, in accordance with embodiments of the present disclosure.

With reference to FIG. 9, the default dragging direction has been set to the left direction 74 using any one of the above-described default dragging direction setting methods. The UI control module 230, upon receipt of the recognized the dynamic discrete control hand gesture, in the form of the dynamic pinching gesture 34A from the gesture recognition system 220 moves the slider element 64 from a first position shown in dotted lines to the left by the discrete distance (d) to a second position shown in solid lines.

In another embodiment, the dynamic discrete control gesture is in the form of a dynamic pinch and release hand gesture 39, shown in FIG. 10. The dynamic pinch and release hand gesture 39 is comprised of pinch close hand gesture 34 followed by a pinch open hand gesture 38. The pinch close hand gesture 34 and pinch open hand gesture 38 have been described above. The hand 35 starts in a pinched open hand configuration 31 held for a short duration $\Delta t_0$ between $t_0$ and $t_1$, followed by a pinch-closed hand configuration 30 held for a very short duration (not shown), and another pinch open hand configuration 31 held for a short duration $\Delta t_1$ between $t_1$ and $t_2$. In this embodiment, the gesture recognition system 220 process frames 800 of a video captured by the digital camera 102 as the user performs a discrete control hand gesture to recognize the dynamic discrete hand gesture, such as the dynamic pinch and release hand gesture 39, performed by the user. The gesture recognition system 220 recognizes the dynamic pinch and release hand gesture 39 when the gesture recognition system 220 determines that the user's hand 35 is in a pinch open hand configuration 31 at time $t_2$. The gesture recognition system 220 provides the recognized dynamic discrete hand gesture, such as the dynamic pinch and release hand gesture 39, to the UI control module 230. The UI control module 230, which has activated the dragging mode for the slider 60, moves the slider element 64 along the track 62 of the slider 60 by the discrete amount (d) to the right. The UI control module 230 may also control a system parameter to adjust the system parameter by a discrete amount.

Figure 11:
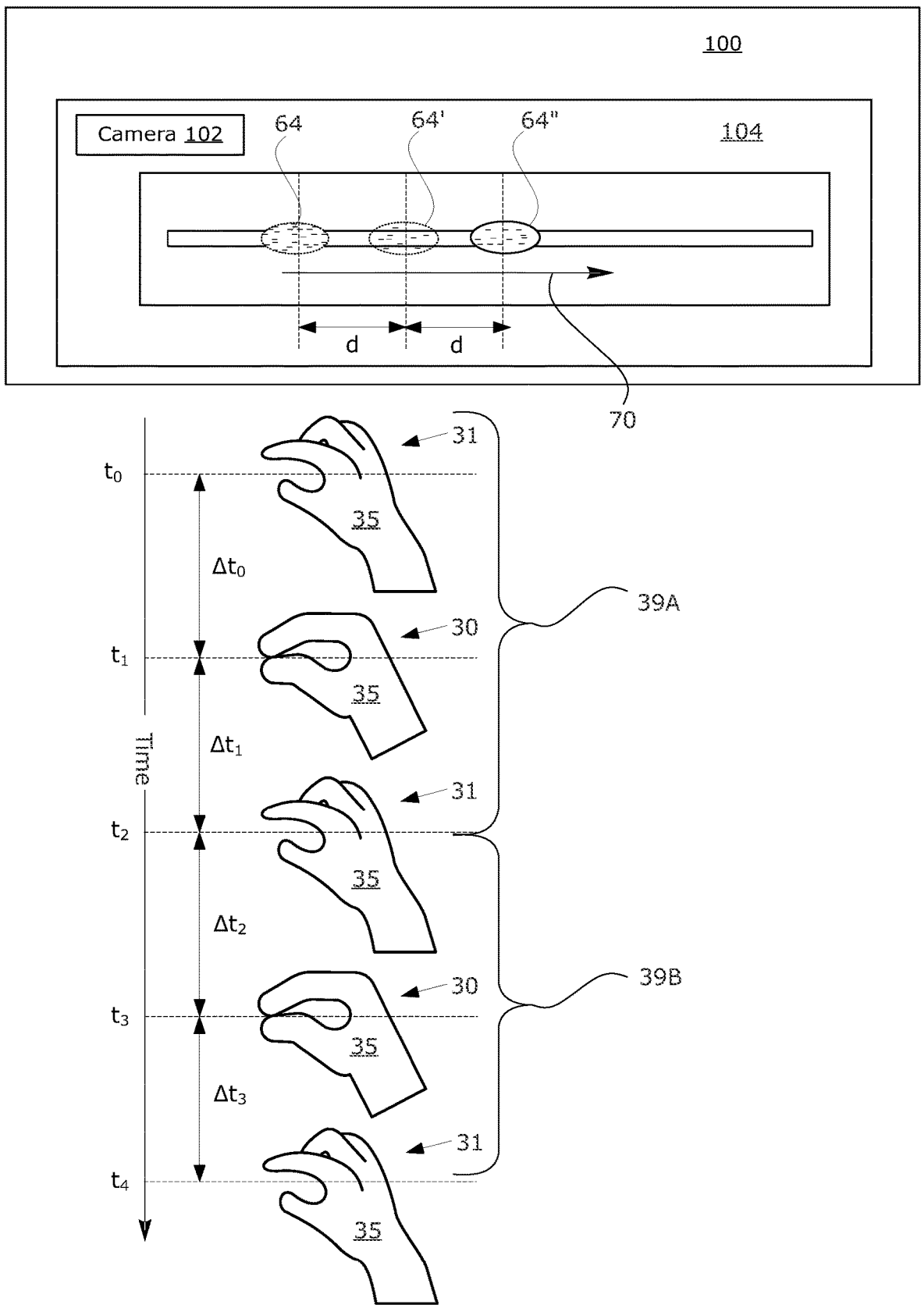
FIG. 11 is a diagram of the gesture-controlled device of FIG. 3 shown capturing and recognition of a plurality of the dynamic discrete control hand gestures, which advance a slider element of the slider in the right direction, in accordance with embodiments of the present disclosure.

A plurality of dynamic discrete control hand gestures may be used to move the draggable element (e.g. the slider element 64) of a UI control element (e.g. the slider) in the default dragging direction by a number of discrete distances (d). For example, a plurality of dynamic pinching mid-air hand gestures may be used to move the slider element 64 by a corresponding number of discrete distances (d) in the default direction as shown in FIG. 11. In FIG. 11, the UI module 230 has set default dragging direction for the slider 60 to the right direction 70. The draggable element (e.g. the slider element 64) of the UI control element (e.g. the slider 60) is shown in dotted lines indicating the initial (first) and intermediate (second) positions thereof. A user's hand 35 is show performing two dynamic discrete control hand gestures in the form of the two dynamic pinch and release hand gestures 39a and 39b. The first dynamic discrete control hand gesture, in the form of the first pinch and release hand gesture 39a starts at time $t_0$ with the hand 35 in a pinch open hand configuration 31. The thumb and index finger move towards each other during the duration $\Delta t_0$ such that at time $t_1$ the hand 35 is in a pinch-closed hand configuration 30. The thumb and index finger start moving away from each other during the duration $\Delta t_1$ such that at time $t_2$ the hand 35 is back in a pinch open hand configuration 31. The first dynamic pinching hand gesture 39A is recognized by the gesture recognition system 220 and provided to the UI control module 230. In response the UI control module 230 causes the slider element 64 to be dragged (move3d) by a discrete distance (d), in the right direction, to a new (second) position shown in dotted lines as slider element 64'. Starting at time $t_2$, the second dynamic discrete control gesture 39B starts with the hand 35 in the pinch open configuration 31. The thumb and index start moving towards each other during the duration $\Delta t_2$ such that at time $t_3$, the hand 35 is in a pinch-closed hand configuration 30. The thumb and index finger then start moving away from each other during the duration $\Delta t_2$ such that at time $t_4$, the hand 35 is in a pinch-closed hand configuration 30 thus completing the pinch and release gesture 39B, which is the second discrete control hand gesture. The gesture sensing system detects the second discrete control hand gesture, which is in the form of the second pinch and release hand gesture 39, and provides the pinch and release hand gesture 39 to the UI control module 230. In response, the UI control module 230 causes the draggable element, in the form of the slider element (shown as slider element 64') to be dragged further to the right by a discrete distance (d) to a new (third) position, shown as slider element 64". In its third position, the slider element 64 is shown as slider element 64" that is at a distance (2d) from its initial (first) position (show as slider element 64). Accordingly, a plurality of dynamic discrete control hand gestures cause the slider element 64 to be dragged in a default dragging direction by a corresponding plurality of the discrete distance (d).

While the dynamic discrete control hand gestures used to move the draggable element, such as the slider element 64, in FIGS. 8-11 have been shown to be either a dynamic pinching hand gesture 34A or a dynamic pinch and release hand gesture 39, other dynamic hand gestures are possible. For example, any dynamic hand gesture in which a user's hand 35 is held in a first hand configuration for a first duration of time followed by a second hand configuration in which the user's hand 35 is held for a second duration of time is also contemplated.

Figure 12:
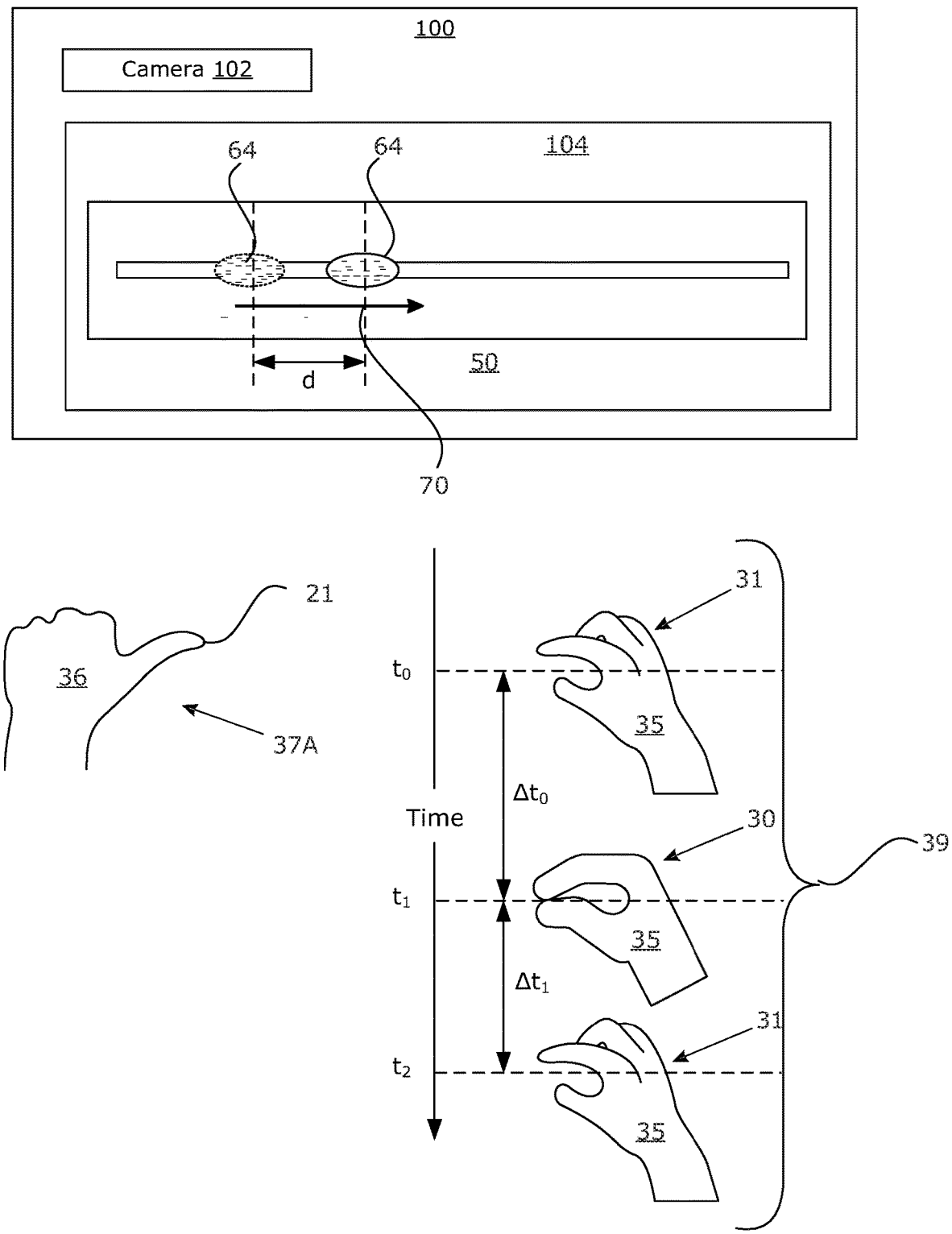
FIG. 12 is a diagram of the gesture-controlled device of FIG. 3 shown capturing and recognition of a dynamic discrete control hand gesture by a primary hand, and a static right directional hand gesture by a secondary hand, in accordance with embodiments of the present disclosure.
Figure 13:
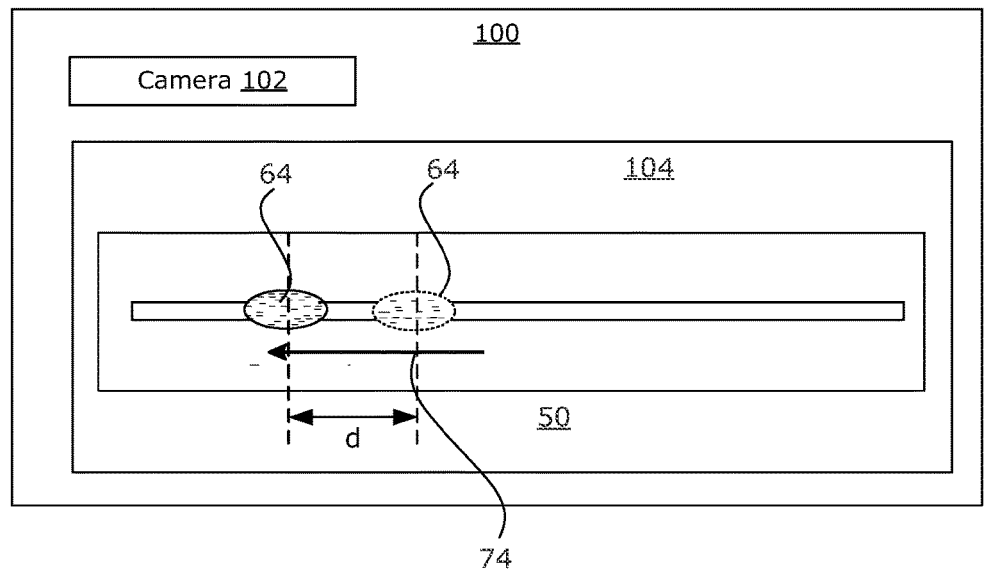
FIG. 13 is a diagram of the gesture-controlled device of FIG. 3 shown capturing and recognition of a dynamic discrete control hand gesture by a primary hand, and a static left directional hand gesture by a secondary hand, in accordance with embodiments of the present disclosure.
Figure 13:
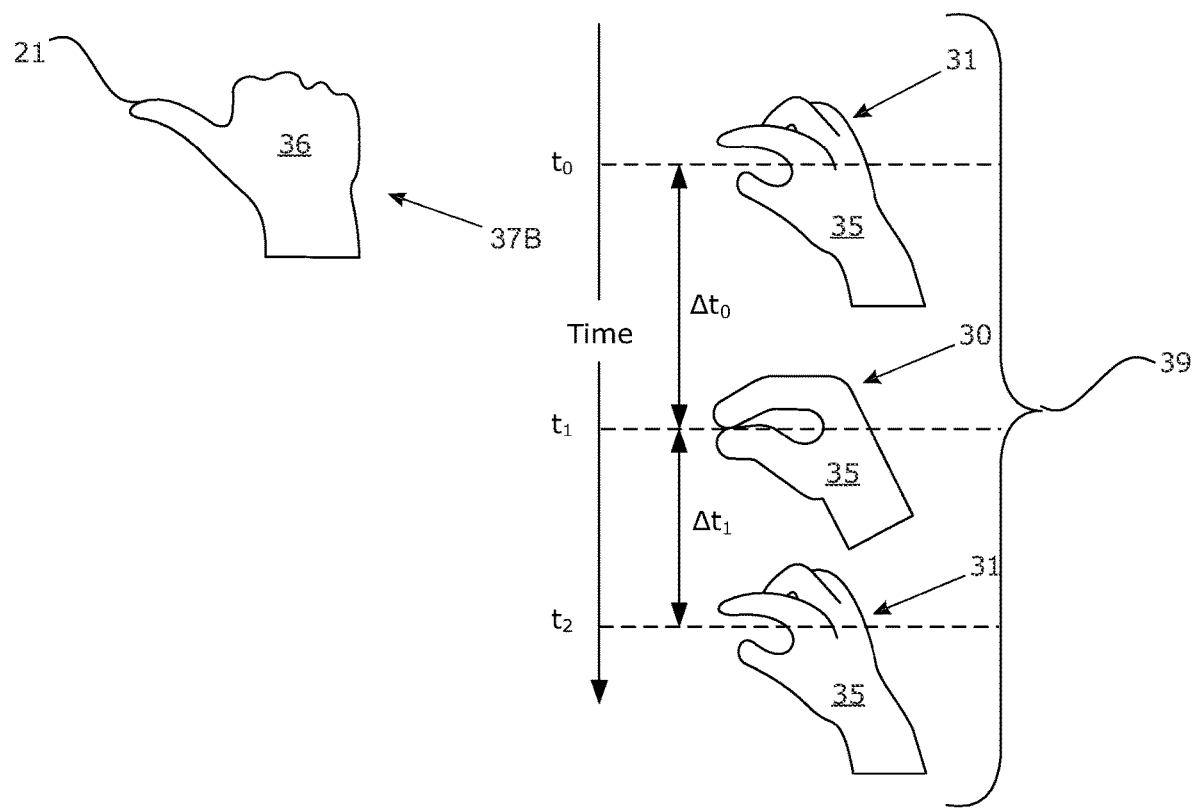

Setting the default dragging direction is not limited to the use of dynamic dragging hand gestures. For example, with reference to FIGS. 12 and 13, a static direction setting mid-air hand gesture is shown in which a secondary hand 36 of a user is held with the thumb 21 pointing in the desired default dragging direction. With reference to FIG. 12, the secondary hand 36 of the user is a static right directional hand gesture 37A in which the thumb 21 is pointing to the right. In some embodiments, a user performs the static direction setting mid-air hand gesture after the UI control module 230 activates dragging mode for the UI control element (e.g. the slider 60) while the primary hand 35 carries out dynamic discrete control hand gestures, such as dynamic pinching hand gestures 34. In other embodiments, the static direction setting mid-air hand gesture is performed by a user while performing the dragging mode activation gesture with their primary hand 35 and the dragging direction is set based on the static directional hand gesture and maintained during the dynamic discrete control hand gestures. In the embodiment depicted in FIG. 12, upon recognition of the static right directional hand gesture 37A in which the thumb 21 is pointing to the right direction 70, the gesture recognition system 220 sets the default dragging direction to the right (or forward) direction 70. The dynamic discrete control gesture, such as dynamic pinching and release gesture 39 shown, is recognized by the gesture recognition system 220 and is provided to the UI control module 230. The UI control module 230 advances the slider element 64 to the right, by a discrete distance (d), as discussed earlier. FIG. 13 depicts a static left directional hand gesture 37B in which the thumb 21 is pointing to the left. In this case, the gesture recognition system 220 sets the default dragging direction to the left direction 74. The dynamic discrete control gesture, such as the dynamic pinch and release gesture 39 shown, causes the slider element 64 to move to the left by a discrete distance (d), as discussed earlier.

In some embodiments, the directional hand gesture made by the secondary hand 36 can change between successive dynamic discrete control hand gestures, such as the dynamic pinching hand gestures 34A or pinch and release hand gestures 39. In one example, the primary hand 35 performs a plurality of dynamic discrete control hand gestures while the secondary hand 36 is performing a static right directional hand gesture 37A with the thumb 21 pointing to the right. Accordingly, the slider element 64 is dragged (moved) to the right direction 70 by a corresponding plurality of discrete distances (d). At that point, the user may decide that the slider element 64 has been dragged too far to the right. The user may switch the secondary hand 36 to a static left directional hand gesture 37B with the thumb 21 pointing to the left and then continue performing dynamic discrete control hand gestures to drag the slider element 64 to the left direction by a corresponding number of discrete distances (d).

Figure 14:
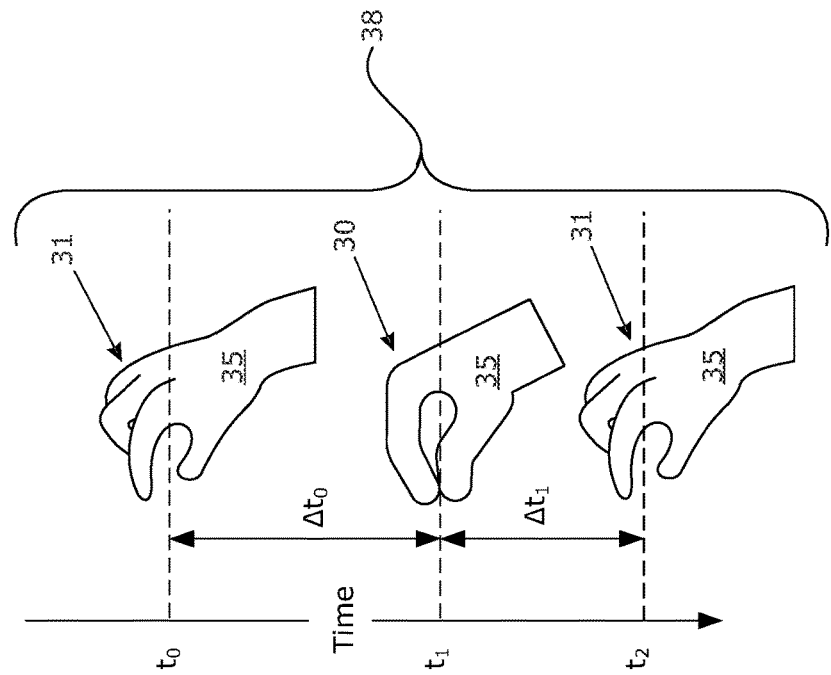
FIG. 14 is a diagram of the gesture-controlled device of FIG. 2 shown capturing and recognition of a dynamic discrete control hand gesture which causes a rotating element of a rotary user interface control to rotate by a discrete circumferential distance, in accordance with embodiments of the present disclosure.
Figure 14:
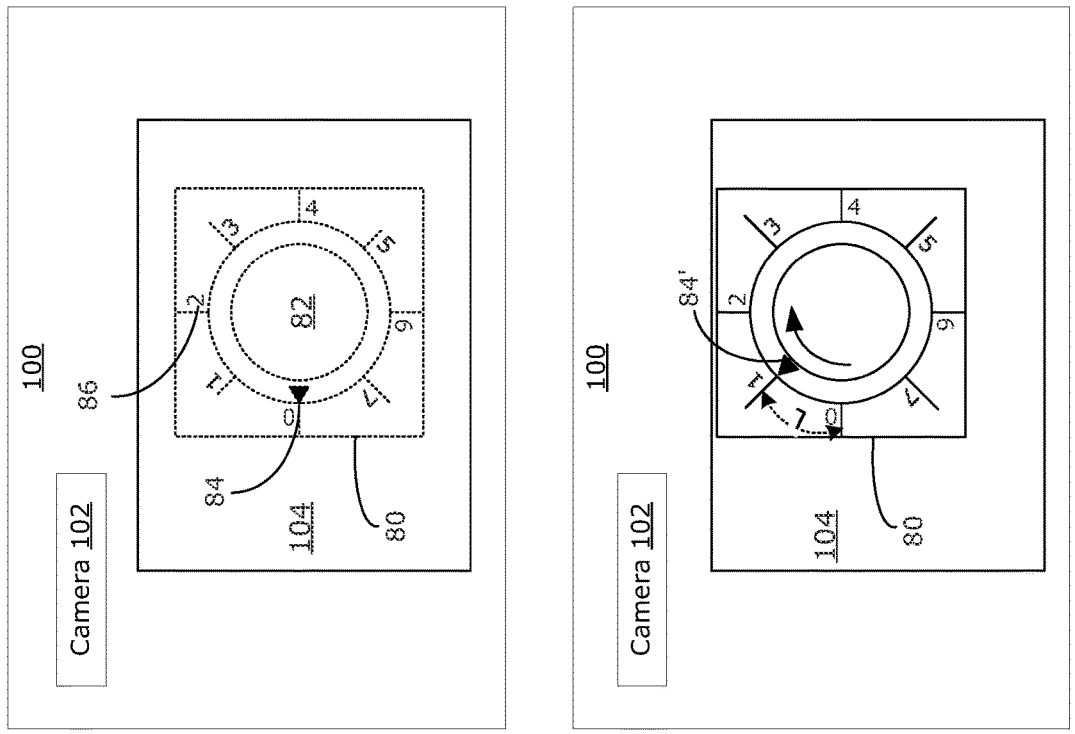

FIG. 14 depicts a rotary UI control element 80, which includes a rotating element 82, which is rotatable about an axis. A plurality of values 86 are circumferentially displayed around the rotating element 82. The rotating element 82 has a value pointer 84 which points to a currently selected value 86 of a system parameter of the plurality of values 86. For example, if the display 104 employs a touchscreen mechanism, the user would touch the rotating element 82 and drag it circumferentially in either the clockwise or the counterclockwise direction to adjust the corresponding system parameter. In another example, the user would use a mouse to point to a location on the rotating element 82, click a mouse button, then move the mouse circumferentially, in either the clockwise or the counterclockwise direction, to rotate the rotating element 82 in the clockwise or the counterclockwise direction. The new position in which the rotating element 82 will correspond to a new value for the system parameter corresponding to the rotary control 80, as indicated by the value pointer 84.

Referring to FIG. 14, an example of controlling dragging of a rotating element 82 of a rotary control 80 using a dynamic discrete control gesture is shown. In the depicted embodiment, the default dragging direction has been set to the clockwise direction using one of the methods described above. Specifically, the gesture recognition system 220 detects a direction setting hand gesture and determines whether the dragging direction is in the clockwise or counter clockwise. For example, with reference to FIG. 4, if X1 is greater than X0, the gesture recognition system 220 determines that, in respect of a rotating object such as a rotary control 80, the default dragging direction is in the clockwise direction. Conversely, with reference to FIG. 5, if X1 is smaller than X0, the gesture recognition system 220 determines that the default dragging direction is in the counter clockwise direction. The default dragging direction is provided by the gesture sensing system to the UI control module 230. Turning back to FIG. 14, the gesture sensing system recognizes a dynamic discrete control gesture which is a dynamic pinch and release gesture 39 described above. The gesture recognition system 220 provides the recognized gesture to the UI control module 230 which causes the rotating element 82 to move circumferentially from a first circumferential position to a second circumferential position, in the default dragging direction provided to the UI control module 230 by the gesture recognition system 220. In the depicted example, the default direction was set to the clockwise direction. Initially, the rotating element 82 is in a first position in which the value pointer 84, which is in the form of a black triangle marked on the rotating element 82, is pointing to the value "0" of the plurality of values 86. The rotary control 80 is shown in dotted lines and represents its state at time $t_0$. A dynamic discrete control gesture, in the form of the dynamic pinch and release gesture 39 is recognized by the gesture recognition system 220. The gesture recognition system 220 sends the dynamic pinch and release gesture to the UI control module 230, which causes movement of the rotating element 82, in a clockwise direction, by a discrete circumferential distance "L" to a second position at $t_2$ shown in solid lines. At the second position, the value pointer 84' is pointing at the value "1" of the plurality of values 86 of the system parameter associated with the rotary control 80. Accordingly, a rotary control 80 may be controlled by using discrete control hand gestures, and the values of a corresponding system parameter may be adjusted in response to the recognition of the discrete control hand gestures.

Figure 15:
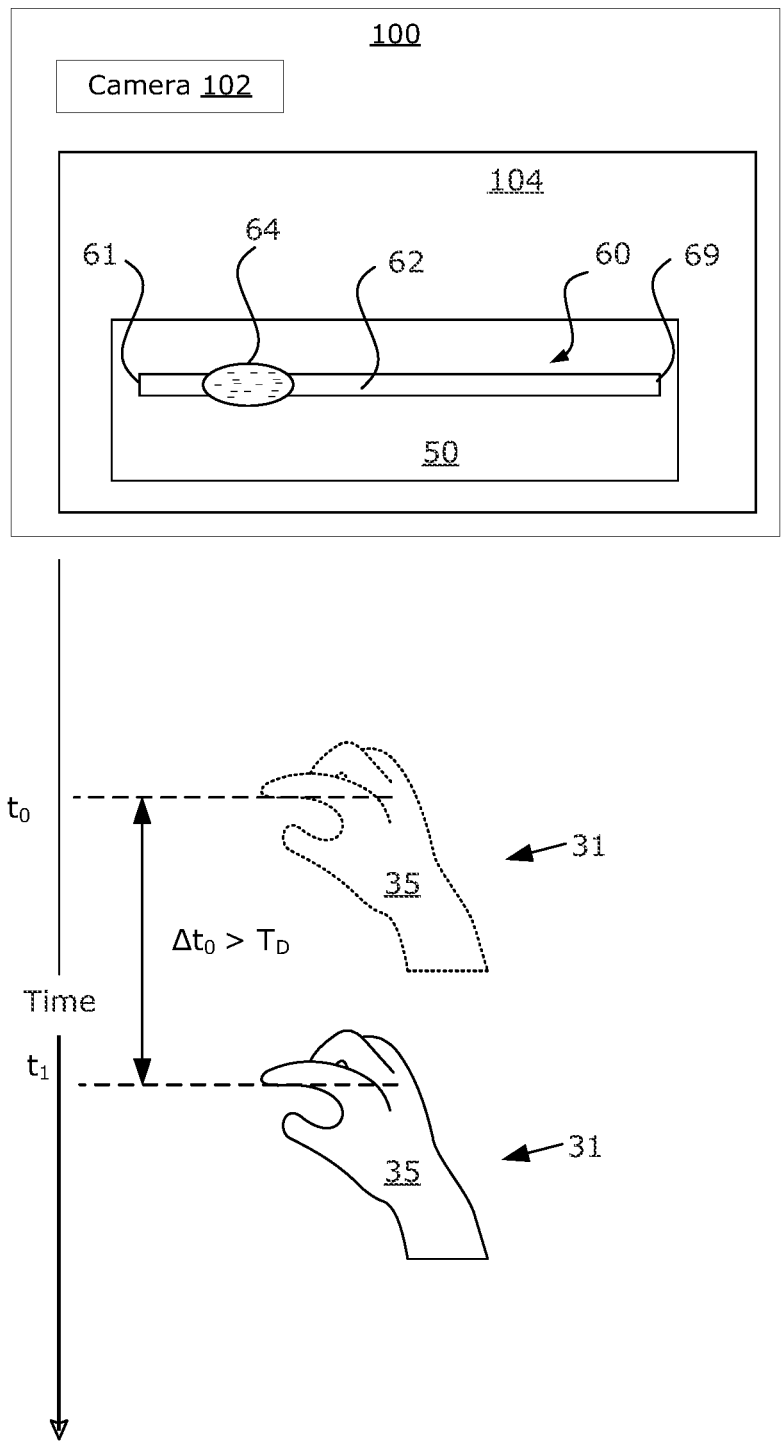
FIG. 15 is a diagram of the gesture-controlled device of FIG. 3 shown capturing and recognition of a static dragging mode deactivation hand gesture, in accordance with embodiments of the present disclosure.

To deactivate the dragging mode, a user may perform a static dragging mode deactivation hand gesture for a deactivation duration $T_D$. For example, with reference to FIG. 15, The gesture recognition system 220 recognizes the static deactivation hand gesture which is comprised of a pinch open hand configuration 31 held for a time duration $\Delta t_0$ from time $t_0$ to time $t_1$. The gesture recognition system 220 provides the deactivation hand gesture to the UI control module 230 which in turn deactivates and exits dragging mode. It should be noted that dynamic pinching gestures (34, 39) should be in the pinch open hand configuration 31 for a duration, which is less than $T_D$ in order to avoid inadvertently leaving dragging mode during a dynamic pinching gesture 34.

Figure 17:
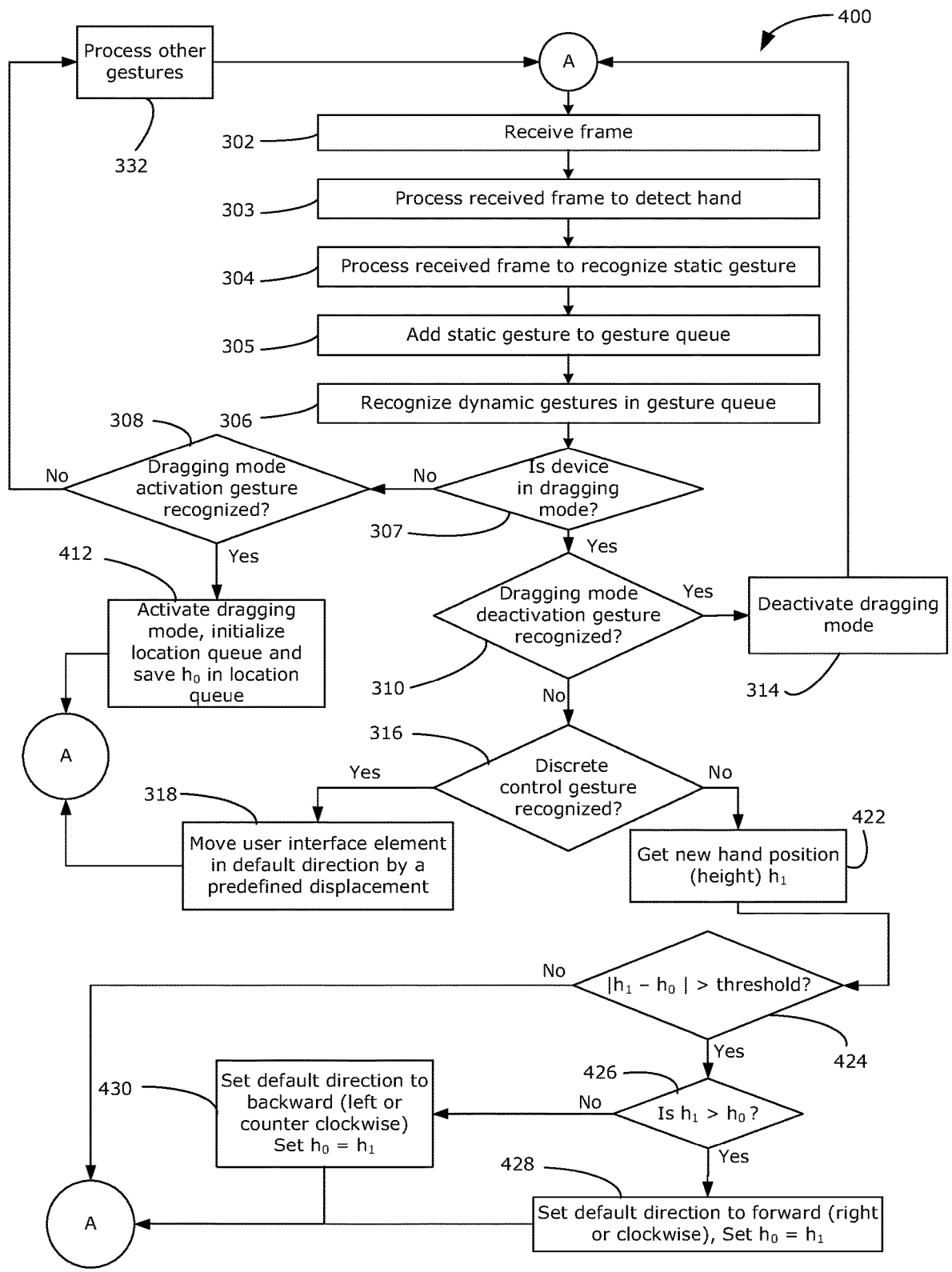
FIG. 17 is a flowchart depicting a method for discrete control of a slider element of a slider control element, including a dynamic generally vertical dragging direction setting mid-air hand gesture, in accordance with embodiments of the present disclosure.
Figure 18:
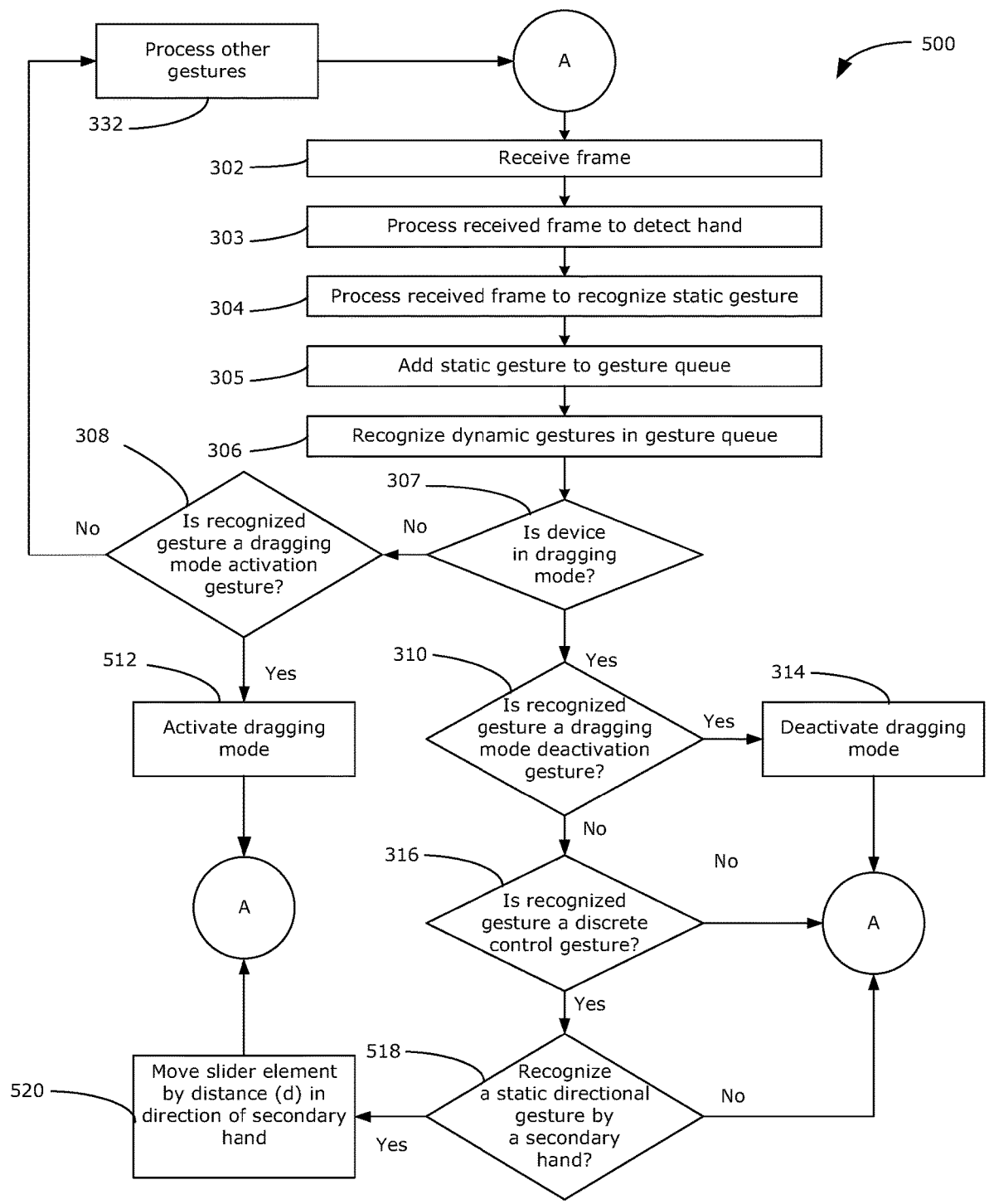
FIG. 18 is a flowchart depicting a method for discrete control of a slider element of a slider control element, including setting the dragging direction by a static directional hand gesture of a secondary hand, in accordance with embodiments of the present disclosure.

The methods executed by the gesture recognition system 220 and UI control module 230, to carry out the above embodiments will be described with reference to FIGS. 16-18.

Figure 16:
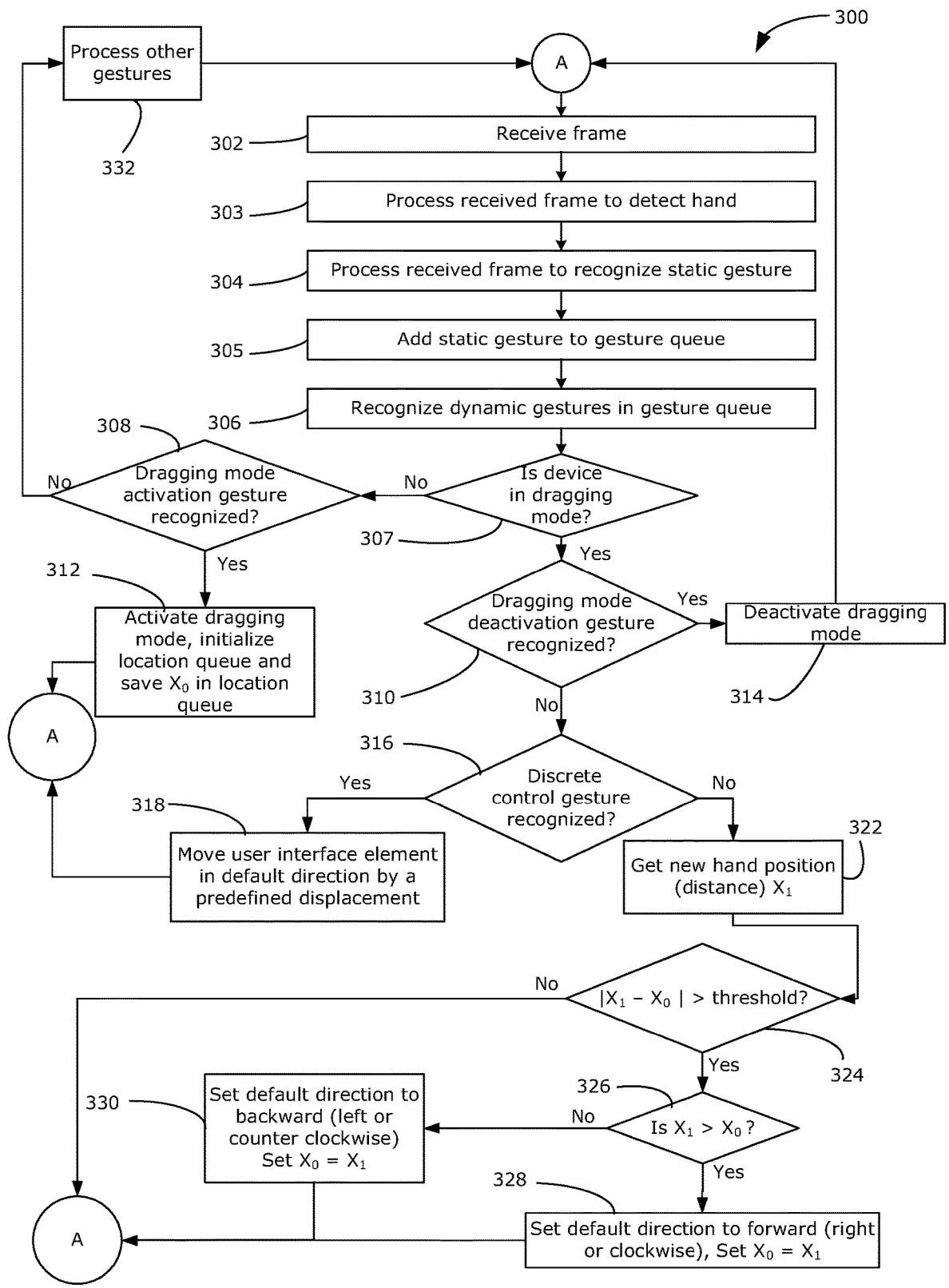
FIG. 16 is a flowchart illustrating a method for discrete control of a slider element of a slider control element, including a dynamic generally horizontal dragging direction setting mid-air hand gesture, in accordance with embodiments of the present disclosure.

FIG. 16 is a flow chart showing a method 300 of discrete control of a draggable element (e.g. a draggable widget) of a UI control element displayed on a gesture-controlled device 100, in accordance with embodiments of the present disclosure. The method 300 may be carried out by software (e.g. the gesture recognition system 220 and the UI control module 230) when instructions of the software are executed by the processor(s) 202 of the gesture-controlled device 100.

The method begins at step 302. At step 302, a frame 800 of a video captured by the digital camera 102 is obtained by the gesture recognition system 220. The method 300 then proceeds to step 303. At step 303, the received frames 800 are processed to detect a hand 35 of a user. The method 300 then proceeds to step 304. At step 304, the received frame is processed to recognize an orientation and configuration of the hand 35. In this example, the configuration of the hand 35 recognized at step 304 is considered to be a current hand configuration performed in the current frame. The method 300 then proceeds to step 305. At step 305, the current hand configuration is added to a queue of hand configurations stored, e.g., in memory 208. The method 300 then proceeds to step 306. At step 306, hand configurations stored in the queue of hand configurations are used to identify a current dynamic gesture, i.e. a movement of the hand 35 over the course of multiple frames.

At step 307, the gesture recognition system 220 determines whether dragging mode for the UI control element has been activated. If dragging mode for the UI control element has not been activated, then at step 308, the gesture recognition system 220 determines whether the recognized dynamic hand gesture is a dragging mode activation hand gesture. If, at step 308, the recognized hand gesture is not a dragging mode activation hand gesture, then the recognized hand gesture is not treated as a dragging mode hand gesture and it is processed as another gesture at step 332. After step 332, control goes back to step 302 via the junction 'A', to receive another frame from the image-capturing device, such as digital camera 102. If, at step 308, the gesture recognition system 220 determines that the recognized hand gesture was a dragging mode activation hand gesture, then the gesture recognition system provides an indication to the UI control module 230 indicating that a dragging mode activation hand gesture was detected. At step 312, the UI control module 230 activates dragging mode. Additionally, the gesture recognition module 220 saves the initial position of the hand 35 at time of dragging mode activation. In this embodiment, the gesture recognition system determines the initial hand position by a distance $X_0$ measured relative to a point of reference on the frame 800 containing the hand gesture, as discussed with respect to FIG. 3. After step 312, control returns, via the junction 'A', to step 302 to receive another frame.

If, at step 307, the gesture recognition system 220 determines that the dragging mode has been activated, then control goes to step 310. At step 310, if the gesture recognition system 220 determines that the recognized hand gesture is a dragging mode deactivation hand gesture, the gesture recognition system 220 provides an indication to the UI control module 230 that a dragging mode deactivation hand gesture has been detected. Control then goes to step 314. At step 314, the UI control module deactivates dragging mode and control goes back to step 302 via the junction 'A'. If at step 310, the gesture recognition system 220 determines that the detected hand gesture was not a dragging mode deactivation hand gesture, then control goes to step 316.

If, at step 316, the gesture recognition system 220 determines that the recognized hand gesture is not a discrete control gesture, then the recognized hand gesture is a direction setting mid-air hand gesture. In this embodiment, the direction setting mid-air hand gesture is a dynamic generally horizontal direction setting mid-air hand gesture 32, as depicted in FIGS. 4 and 5. To determine the default dragging direction, the gesture recognition system 220 determines the current position of the hand, at step 322, as a distance $X_1$ relative to a point of reference on the captured frame 800. At step 324, the gesture recognition system 220 determines the magnitude of the difference between the current position as indicated by the distance $X_1$ and the initial position indicated by the distance $X_0$ (saved at step 312) is determined. If the magnitude of the difference determined by $|X_1-X_0|$ does not exceed a particular threshold, then the gesture recognition system 220 determines that the hand 35 has not moved enough in a generally horizontal direction to indicate a dragging direction. Likely the user's hand 35 was just shaking or unstable. In this case, control goes back to step 302 via junction 'A'. On the other hand, if at 324, the gesture recognition system 220 determines that the magnitude of the difference between the current position, represented by the distance $X_1$ and the initial position, represented by the distance $X_0$ is greater than a predefined threshold, then control goes to step 326. At step 326, the gesture recognition system 220 determines the desired dragging direction. At step 326, if $X_1$ is greater than $X_0$, then at step 328 the gesture recognition system 220 set the dragging direction to the right or forward direction. Additionally, the gesture recognition system 220 updates the initial position, represented by the distance $X_0$ to the value of the new distance $X_1$. Accordingly, if the gesture recognition system 220 detects a new direction setting mid-air hand gesture, the initial position, represented by the distance $X_0$ is correctly set. For example, a new dynamic generally horizontal direction setting mid-air hand gesture 32 may be recognized in upcoming captured frames. The new direction may be in an opposite direction to the currently set dragging direction. The new distance $X_1$ will therefore be smaller than the current distance $X_0$, and so on. After the gesture recognition system 220 sets the dragging direction, control goes back to step 302 via the junction 'A'. On the other hand, at step 326, if the gesture recognition system 220 determines that $X_1$ is smaller than $X_0$, then at step 330 the gesture recognition system 220 sets the dragging direction to the left or backward direction, sets the initial distance $X_0$ to $X_1$, and control goes back to step 302 via the junction 'A'.

If, at step 316, the gesture recognition system 220 determines that the detected hand gesture is a dynamic discrete control hand gesture, then control goes to step 318. At step 318, the gesture recognition system 220 indicates, to the UI control module 230, that a dynamic discrete control hand gesture has been detected and includes its direction thereto. The UI control module 230, in turn, causes the slider element 64 to be dragged (moved) in the default dragging direction by a predefined distance (d). If the discrete control gesture was recognized before any dragging direction setting gestures are recognized, then the UI control module moves the slider element 64 in a default direction. For example, the UI control module 230 may be configured so that the default direction is the forward (or right) direction. After the UI control module 230 causes moving (dragging) of the slider element 64 by a predefined distance (d) to a new discrete position, control returns to step 302 via junction 'A'.

In some embodiments, the distance (d) by which the UI control module 230 moves the slider element 64 is configurable by a system menu or any other configuration setting means. In other embodiments, the distance (d) is dependent on the difference between the initial distance $X_0$ and the subsequent distance $X_1$. For example, when the gesture recognition system 220 determines the dragging direction, provides it, along with the initial distance X0 and the subsequent distance X1, to the UI control module 230. The UI control module 230 uses the difference between X0 and X1 to determine the discrete distance (d) by which the UI control module 230 moves the draggable element of a UI control element. In other words, how far the hand 35 is moved, in a generally horizontal direction from its initial position, determines the discrete distance (d) that the slider element 64 is moved by, in response to a single discrete control hand gesture. The magnitude of the distance difference is represented by $|X_1-X_0|$. This difference magnitude may be multiplied by a calibration factor to determine the distance (d) used by the UI control 230 to move the draggable element of a UI control element.

As discussed above, in another example embodiment, the dragging direction may be set in response to varying the height of the hand 35 relative to the display 104. With reference to FIG. 17 a method 400 of discrete control of a user interface control using hand gestures is depicted, in accordance with embodiments of the present disclosure. Many of the steps of the method 400 are similar to, and have the same reference numerals as, the corresponding steps in the method 300 of FIG. 16. Accordingly, these steps are not going to be described again. With reference to FIG. 17, at step 412, the gesture recognition system 220 has activated dragging mode and saved the initial position as defined by the initial height $h_0$ between a point on the hand 35 and a reference point on the frame 800. The initial height $h_0$ may be measured relative to the bottom edge 830 of the frame 800, or another point of reference on the frame 800. At step 422, the gesture recognition system 220 determines the subsequent hand position as defined by the subsequent hand height $h_1$ between the hand 35 and the reference point of the frame 800. At step 424, the gesture recognition system 220 determines the magnitude of the difference between the subsequent position, as defined by the subsequent height $h_1$ of the hand 35 at the end of the dynamic generally vertical direction setting mid-air hand gesture 33 and the initial position, as defined by the initial height $h_0$. The gesture recognition system 220 compares the determined magnitude of the difference with a particular threshold. If the magnitude of the difference is less than the particular threshold then, at step 422, control goes back to step 302 via junction 'A', to receive a new frame, and the gesture recognition system 220 does not set the dragging direction. On the other hand, if the magnitude of the difference between the subsequent position, as defined by the subsequent height $h_1$ and the initial position, as defined by the initial height $h_0$ is greater than the particular threshold, control goes to step 426. At step 426, if $h_1$ is greater than $h_0$, then control goes to step 428. At step 428, the gesture recognition system 220 sets the direction to the right or forward direction and the initial height $h_0$ to be equal to the subsequent (current) height $h_1$. At step 428, if the subsequent height $h_1$ is less than the initial height $h_0$, then control goes to step 430. At step 430, the gesture recognition system 220 sets the dragging direction to the left or backward direction and the initial height $h_0$ to the subsequent height $h_1$. Both steps 428 and 430 transfer control back to step 302 via the junction 'A'.

In yet another embodiment, as discussed with reference to FIGS. 11 and 12, there is provided a method 500 for discrete control of a draggable element (e.g. slider element 64) of a UI control element (e.g. slider 60) using hand gestures, the method shown in FIG. 18. The method steps, in FIG. 18, which have the same reference numerals as corresponding method steps in methods 300 and 400 perform the same functions. The method 500 represents an embodiment in which the dragging direction is set during the dynamic discrete control hand gesture, such as a dynamic pinching hand gesture 34 or the dynamic pinch and release hand gesture 39. For example, method 500 contains no explicit step for determining the dragging direction. At step 308 if the gesture recognition system 220 recognizes a dragging mode activation gesture, then control goes to step 512. At step 512, the gesture recognition system activates dragging mode and control goes back to step 302 via the junction 'A'. At step 316, when the gesture recognition system 220 detects a discrete control gesture, control goes to step 518. At step 518, if the gesture recognition system 220 recognizes no static directional hand gesture (right 37A or left 37B), then gesture recognition system 220 ignores the dynamic discrete control hand gesture and control returns to step 302 via the junction 'A', to receive and process another frame. If, at step 518, the gesture recognition system 220 recognizes a secondary hand 36 indicating the dragging direction using a static directional hand gesture (37A, 37B), then the gesture recognition system 220 provides an indication to the UI control module 230 of the dragging direction. The gesture recognition system 220 also provides the discrete control gesture detected at step 316 to the UI control module 230. Control then goes to step 520. At step 520, the UI control module 230 moves the slider element 64 by a distance (d) in the dragging direction determined by the secondary hand 36.

In another example of the method 500, the absence of the secondary hand 36 simply causes the slider element 64 to be dragged in a default direction.

FIG. 19 depicts a method 700, carried out by a gesture recognition system 220, for controlling a user interface control element displayed on a display 104 of a gesture-controlled device 100. The method starts at step 710 by obtaining a first plurality of video frames of a video captured by an image-capturing device of the gesture-controlled device. At step 720, a dragging mode for the user interface control element is activated in response to recognition of a dragging mode activation mid-air hand gesture performed by a user of the gesture-controlled device in the first plurality of video frames. At step 730, a second a second plurality of video frames of the video captured by the image-capturing device of the gesture-controlled device, are obtained. At step 740, a draggable graphical widget of the user interface control element is moved, by a discrete distance, in a default dragging direction in response to recognition of a dynamic discrete control mid-air hand gesture performed by the user of the gesture-controlled device in the second plurality of video frames.

While some of the above embodiments discussed a slider 60, other types of controls, which modify the value of a system parameter, are contemplated. For example, the discrete control gestures may be used to scroll the contents of a display upwardly or downwardly. The dynamic directional hand gestures may be used to determine the direction of scrolling. As another example, the discrete control gestures may be used to zoom in and zoom out the contents of a display. In this example, the dynamic direction setting mid-air hand gestures can be used to determine whether the display is to be zoomed in or out.

While some of the above embodiments describe a rotary control used to control a system parameter, such as audio volume, contrast or brightness, the rotary control may involve moving handles of a clock to adjust the time, for example.

Certain adaptations and modifications of the described embodiments can be made. Therefore, the above discussed embodiments are considered to be illustrative and not restrictive.

The invention claimed is:

1. A method for controlling a user interface control element displayed on a display of a gesture-control device, the user interface control element the method comprising:
   obtaining a first plurality of video frames of a video captured by an image-capturing device of the gesture-controlled device;
   activating a dragging mode for the user interface control element in response to recognition of a dragging mode activation mid-air hand gesture performed by a user of the gesture-controlled device in the first plurality of video frames;
   obtaining a second plurality of video frames of the video captured by the image-capturing device of the gesture-controlled device;
   setting a default dragging direction for a draggable graphical widget of the user interface control element in response to recognition of a direction setting mid-air hand gesture in the second plurality of video frames; and moving, the draggable graphical widget of the user interface control element, by a predefined distance, in the default dragging direction in response to recognition of a dynamic discrete control mid-air hand gesture performed by the user of the gesture-controlled device in the second plurality of video frames.

2. The method of claim 1, further comprising adjusting a system parameter associated with the user interface control element by a predefined amount.

3. The method of claim 1, further comprising deactivating the dragging mode for the user interface control element in response to recognition of a dragging mode deactivation hand gesture performed by the user of the gesture-controlled device in the second plurality of video frames.

4. The method of claim 1, wherein recognition of the direction setting mid-air hand gesture comprises recognition of a dynamic direction setting mid-air hand gesture by a primary hand in the second plurality of video frames of the video.

5. The method of claim 4, wherein recognition of the dynamic direction setting mid-air hand gesture comprises determining an initial position of the primary hand of the user within the first plurality of video frames; and recognition of the dynamic direction setting mid-air hand gesture comprises determining that the primary hand has moved from the initial position to a subsequent position within the second plurality of video frames.

6. The method of claim 5, wherein:
the initial position is determined between a point on the primary hand and a point of reference within the first plurality of video frames; and
the subsequent position is determined between a point on the primary hand and a point of reference within the second plurality of video frames.

7. The method of claim 6, wherein:
the initial position is determined by an initial horizontal distance between the point on the primary hand and the point of reference within the first plurality of video frames; and
the subsequent position is determined by a subsequent horizontal distance between the point on the primary hand and the point of reference within the second plurality of video frames.

8. The method of claim 6, wherein:
the initial position is determined by an initial height between the point on the primary hand and the point of reference within the first plurality of video frames; and
the subsequent position is determined by a subsequent height between the point on the primary hand and the point of reference within the second plurality of video frames.

9. The method of claim 5, wherein setting the default dragging direction further comprises:
comparing the initial position and the subsequent position; and
determining whether a difference between the initial position and the subsequent position is greater than a particular threshold.

10. The method of claim 9, wherein the predefined distance is based on the difference between the initial position and the subsequent position.

11. The method of claim 1, wherein recognition of the direction setting mid-air hand gesture comprises recognition of a direction setting mid-air hand gesture by a secondary hand in the second plurality of video frames.

12. The method of claim 1, wherein the dynamic discrete control mid-air hand gesture comprises a dynamic pinching mid-air hand gesture.

13. The method of claim 12, wherein the dynamic pinching mid-air hand gesture comprises a pinch open hand gesture followed by a pinch closed hand gesture.

14. The method of claim 1, wherein:
the user interface control element comprises a slider control; and
moving the draggable graphical widget of the user interface control element comprises dragging a slider element along a track of the slider control.

15. The method of claim 1, wherein moving the draggable graphical widget of the user interface control element by a predefined distance, in the default dragging direction comprises:
incrementing or decrementing the draggable graphical widget by a discrete amount along a continuous control element, based on the default dragging direction, in response to recognition of the dynamic discrete control mid-air hand gesture performed by the user in the second plurality of video frames.

16. A gesture-controlled device comprising:
an image-capturing device;
a processor;
a memory coupled to the processor, the memory storing machine-executable instructions which, when executed by the processor, cause the gesture-controlled device to:
process a first plurality of video frames of a video captured by the image-capturing device to recognize hand gestures performed by a user of the gesture-controlled device;
activate a dragging mode for controlling a user interface control element in response to recognition of a dragging mode activation mid-air hand gesture in the first plurality of video frames;
process a second plurality of video frames of the video captured by the image-capturing device to recognize hand gestures performed by the user of the gesture-controlled device;
set a default dragging direction for a draggable graphical widget of the user interface control element in response to recognition of a direction setting mid-air hand gesture in the second plurality of video frames; and
move the draggable graphical widget of the user interface control element, by a predefined distance, in the default dragging direction in response to recognition of a dynamic discrete control mid-air hand gesture performed by the user in the second plurality of video frames.

17. The gesture-controlled device of claim 16, wherein the machine-executable instructions further cause the gesture-controlled device to deactivate the dragging mode for the user interface control element in response to recognition of a dragging mode deactivation hand gesture performed by the user of the gesture-controlled device in the second plurality of video frames.

18. The gesture-controlled device of claim 8, wherein the recognition of the direction setting mid-air hand gesture comprises recognition of a dynamic direction setting mid-air hand gesture by a primary hand in the second plurality of video frames of the video.

19. The gesture-controlled device of claim 16, wherein the machine-executable instructions cause the gesture-controlled device to move the draggable graphical widget of the user interface control element by a predefined distance, in the default dragging direction by:

incrementing or decrementing the draggable graphical widget by a discrete amount along a continuous control element, based on the default dragging direction, in response to recognition of the dynamic discrete control mid-air hand gesture performed by the user in the second plurality of video frames.

20. A non-transitory computer-readable medium having machine-executable instructions stored thereon, the machine-executable instructions, when executed by a processor of a gesture-controlled device, cause the gesture-controlled device to:

process a first plurality of video frames of a video captured by an image-capturing device to recognize hand gestures performed by a user of the gesture-controlled device;

activate a dragging mode for controlling a user interface control element in response to recognition of a dragging mode activation mid-air hand gesture in the first plurality of video frames;

process a second plurality of video frames of the video captured by the image-capturing device to recognize hand gestures performed by the user of the gesture-controlled device;

set a default dragging direction for a draggable graphical widget of the user interface control element in response to recognition of a direction setting mid-air hand gesture in the second plurality of video frames; and move the draggable graphical widget of the user interface control element, by a predefined distance, in the default dragging direction in response to recognition of a dynamic discrete control mid-air hand gesture performed by the user in the second plurality of video frames.

* * * * *